(12) United States Patent
Zhang et al.

(10) Patent No.: US 12,743,333 B2
(45) Date of Patent: Sep. 22, 2026

(54) APPLICATION RUNNING METHOD, APPARATUS, ELECTRONIC DEVICE AND STORAGE MEDIUM

(71) Applicant: Samsung Electronics Co., Ltd., Suwon-si (KR)

(72) Inventors: Mujun Zhang, Guangzhou (CN); Cao Chen, Guangzhou (CN); Jibin Wu, Guangzhou (CN); Zhongmin Huang, Guangzhou (CN); Xiaolong Zi, Guangzhou (CN); Xihong Liu, Guangzhou (CN); Kaiming Chen, Guangzhou (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 18/911,941

(22) Filed: Oct. 10, 2024

(65) Prior Publication Data

US 2025/0036502 A1 Jan. 30, 2025

Related U.S. Application Data

(63) Continuation of application No. PCT/IB2023/057517, filed on Jul. 25, 2023.

(30) Foreign Application Priority Data

Sep. 6, 2022 (CN) ......................... 202211084693.8

(51) Int. Cl.
*G06F 11/07* (2006.01)
*G06F 11/34* (2006.01)

(52) U.S. Cl.
CPC ...... *G06F 11/0793* (2013.01); *G06F 11/0721* (2013.01); *G06F 11/079* (2013.01);
(Continued)

(58) Field of Classification Search
CPC ............. G06F 11/0721; G06F 11/3447; G06F 11/079; G06F 11/0793; G06F 11/3442; G06F 2201/865
See application file for complete search history.

(56) References Cited

U.S. PATENT DOCUMENTS 9,189,308 B2 * 11/2015 Young ................. G06F 11/0754
9,223,961 B1 12/2015 Sokolov
(Continued)

FOREIGN PATENT DOCUMENTS

CN 114201363 A 3/2022
EP 4564175 A1 * 6/2025 .......... G06F 11/3006
(Continued)

OTHER PUBLICATIONS

B. Chen, M. W. Shih and Y. L. Huang, "An Anomaly Detection Module for Firefox OS," 2014 IEEE Eighth International Conference on Software Security and Reliability-Companion, San Francisco, CA, USA, 2014, pp. 176-184 (Year: 2014).*
(Continued)

*Primary Examiner* — Joseph R Kudirka
(74) *Attorney, Agent, or Firm* — Jefferson IP Law, LLP

(57) ABSTRACT

A method of controlling an electronic apparatus for running at least one application is provided. The method includes obtaining feature data corresponding to a plurality of running applications, wherein the feature data comprises current system state data and running state data corresponding to the at least one application, identifying a target abnormal application based on the feature data corresponding to the plurality of the running applications, obtaining interactive data corresponding to a plurality of call actions of the target abnormal application within a preset duration, identifying a target abnormal call action based on the interactive data corresponding to the plurality of the call actions, and per-
(Continued)

forming call restriction on the target abnormal call action based on monitoring the target abnormal call action.

20 Claims, 16 Drawing Sheets

(52) U.S. Cl.
CPC ...... *G06F 11/3442* (2013.01); *G06F 11/3447* (2013.01); *G06F 2201/865* (2013.01)

(56) References Cited

U.S. PATENT DOCUMENTS

| | | | | |
|---|---|---|---|---|
| 10,120,428 | B2 * | 11/2018 | Kim | G06F 1/28 |
| 10,127,125 | B2 * | 11/2018 | Krishnan | G06F 11/0751 |
| 10,789,632 | B2 | 9/2020 | Poon et al. | |
| 11,163,633 | B2 * | 11/2021 | Bangad | G06F 11/0772 |
| 2012/0166869 | A1 * | 6/2012 | Young | G06F 11/079 714/15 |
| 2019/0073258 | A1 | 3/2019 | Young et al. | |
| 2019/0188007 | A1 * | 6/2019 | Chen | H04L 41/082 |
| 2019/0278908 | A1 | 9/2019 | Mehta et al. | |
| 2020/0089875 | A1 * | 3/2020 | Lew | G06F 21/554 |
| 2020/0371892 | A1 * | 11/2020 | Huang | G06N 20/00 |
| 2023/0004979 | A1 * | 1/2023 | Cheng | G06N 7/01 |

FOREIGN PATENT DOCUMENTS

| | | | |
|---|---|---|---|
| JP | 2004-287945 | A | 10/2004 |
| JP | 2018-136651 | A | 8/2018 |
| KR | 10-2014-0046120 | A | 4/2014 |
| WO | 2021-261901 | A1 | 12/2021 |

OTHER PUBLICATIONS

International Search Report dated Nov. 13, 2023, issued in International Patent Application No. PCT/IB2023/057517.

* cited by examiner

FIG. 11

| A=0 | Lfps=0 | Lfps=1 | Lfps=2 | Lfps=3 |
|---|---|---|---|---|
| Lcps=0 | 0 | 0 | 0 | 0 |
| Lcps=1 | 0 | 0 | 0 | 0 |
| Lcps=2 | 0 | 0 | 0 | 0 |
| Lcps=3 | 0 | 0 | 0 | 0 |
| Lcps=4 | 0 | 0 | 0 | 0 |
| A=1 | Lfps=0 | Lfps=1 | Lfps=2 | Lfps=3 |
| Lcps=0 | 0 | 0 | 0 | 0 |
| Lcps=1 | 0 | 0 | 0 | 0 |
| Lcps=2 | 0 | 0 | 0 | 0 |
| Lcps=3 | 0 | 0 | 0 | 0 |
| Lcps=4 | 0 | 0 | 0 | 0 |
| A=2 | Lfps=0 | Lfps=1 | Lfps=2 | Lfps=3 |
| Lcps=0 | 0 | 0 | 0 | 0 |
| Lcps=1 | 0 | 0 | 0 | 0 |
| Lcps=2 | 0 | 0 | 0 | 0 |
| Lcps=3 | 0 | 0 | 0 | 0 |
| Lcps=4 | 0 | 0 | 0 | 0 |

APPLICATION RUNNING METHOD, APPARATUS, ELECTRONIC DEVICE AND STORAGE MEDIUM

CROSS-REFERENCE TO RELATED APPLICATION(S)

This application is a continuation application, claiming priority under § 365(c), of an International application No. PCT/IB2023/057517, filed on Jul. 25, 2023, which is based on and claims the benefit of a Chinese patent application number 202211084693.8, filed on Sep. 6, 2022, in the Chinese Intellectual Property Office, the disclosure of which is incorporated by reference herein in its entirety.

BACKGROUND

1. Field

The disclosure relates to a computer technical field. More particularly, the disclosure relates to an application running method, apparatus, electronic device and storage medium.

2. Description of Related Art

With the development of mobile electronic terminals (such as a mobile phone, a tablet computer, or the like), more and more users choose to install varieties of applications on the electronic terminals. The applications in the electronic terminals may call system services to achieve various functions. However, calling system services with an abnormal high-frequency may lead to problems of heating, lagging, fast power loss, and even restart of electronic terminals.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an application running method, apparatus, electronic device and storage medium.

Additional aspects will be set forth in part in the description which follows and, in part, will be apparent from the description, or may be learned by practice of the presented embodiments.

In accordance with an aspect of the disclosure, a method of controlling an electronic apparatus for running at least one application is provided. The method includes obtaining feature data corresponding to a plurality of running applications, wherein the feature data comprises current system state data and running state data corresponding to the at least one application, identifying a target abnormal application based on the feature data corresponding to the plurality of the running applications, obtaining interactive data corresponding to a plurality of call actions of the target abnormal application within a preset duration, identifying a target abnormal call action based on the interactive data corresponding to the plurality of the call actions, and performing call restriction on the target abnormal call action based on monitoring the target abnormal call action.

The identifying the target abnormal application based on the feature data corresponding to the plurality of running applications comprises, identifying target applications from among the plurality of running applications based on the running state data corresponding to the plurality of running applications, and identifying the target abnormal application from among the target applications based on feature data corresponding to the target applications.

The running state data corresponding to the application comprises a central processing unit (CPU) occupancy rate when the application is running. The identifying the target applications from among the plurality of running applications based on the running state data corresponding to the plurality of running applications comprises, selecting the top N applications of highest CPU occupancy rate from among the plurality of running applications, wherein the N is a preset positive integer; and identifying the top N applications of highest CPU occupancy rate as the target applications.

The identifying the target abnormal application from among the target applications based on the feature data corresponding to the target applications comprises, obtaining a corresponding decision result of each target application through a decision tree model based on the feature data corresponding to each target application, and identifying the target abnormal application from among the target applications based on the decision results.

After the identifying the target abnormal application based on the feature data corresponding to the plurality of running applications, the method further comprises, displaying a first notification information, wherein the first notification information indicates the existence of the target abnormal application and prompts a user an optimization function for the target abnormal application is able to be opened, and executing a first operation based on receiving an opening instruction for the optimization function. The first operation comprises, obtaining the interactive data corresponding to the plurality of call actions of the target abnormal application within the preset duration, identifying the target abnormal call action based on the interactive data corresponding to the plurality of call actions, performing the call restriction on the target abnormal call action based on monitoring the target abnormal call action.

The method further includes, displaying second notification information during the process of the first operation, wherein the second notification information prompts the user the optimization function for the target abnormal application is able to be closed, and stopping executing the first operation based on receiving a closing instruction for the optimization function.

After the identifying the target abnormal call action based on the interactive data corresponding to the plurality of call actions, the method further comprises, obtaining a label indicating whether the decision result is correct, and updating the decision tree model based on the label and the feature data corresponding to the target abnormal application.

A call action comprises a first type of call action and a second type of call action, wherein the first type of call action is calling any one function in a system service by any one thread in the target abnormal application, the second type of call action is calling any one function in other applications by any one thread in the target abnormal application, the interactive data comprises a number of calls of a call action within the preset duration, the identifying the target abnormal call action based on the interactive data corresponding to the plurality of call actions comprises, screening the first type of call actions from among the plurality of call actions, identifying the first type of call action with the most number of calls as a target call action, and identifying the target abnormal call action based on the number of calls of the target call action within the preset duration.

The identifying the target abnormal call action based on the number of calls of the target call action within the preset duration comprises, obtaining an abnormal probability of the target call action through a Gaussian mixture clustering model based on the number of calls of the target call action within the preset duration, and identifying the target call action as the target abnormal call action based on the abnormal probability being higher than a preset threshold.

The performing the call restriction on the target abnormal call action based on monitoring the target abnormal call action comprises, suspending the execution of the target abnormal call action based on monitoring the target abnormal call action, and releasing the suspension of the target abnormal call action after preset suspension time has elapsed.

The method further includes during the process of performing the call restriction on the target abnormal call action, adjusting the preset suspension time several times through a reinforcement learning model based on power consumption data and performance data corresponding to the target abnormal application, to achieve an optimal suspension time.

In accordance with another aspect of the disclosure, an electronic apparatus for running at least one application is provided. The electronic apparatus includes memory storing one or more computer programs, and one or more processors communicatively coupled to the memory, wherein the one or more computer programs include computer-executable instructions that, when executed by the one or more processors individually or collectively, cause the electronic apparatus to obtain feature data corresponding to a plurality of running applications, wherein the feature data comprises current system state data and running state data corresponding to an application, identify a target abnormal application based on the feature data corresponding to the plurality of running applications, obtain the interactive data corresponding to a plurality of call actions of the target abnormal application within a preset duration, identify a target abnormal call action based on the interactive data corresponding to the plurality of call actions, and perform call restriction on the target abnormal call action based on monitoring the target abnormal call action.

The one or more computer programs further include computer-executable instructions that, when executed by the one or more processors, cause the electronic device to identify target applications from among the plurality of running applications based on the running state data corresponding to the plurality of running applications, and identify the target abnormal application from among the target applications based on feature data corresponding to the target applications.

The running state data corresponding to the application comprises a CPU occupancy rate when the application is running. The at least one processor further configured to select the top N applications of highest CPU occupancy rate from among the plurality of running applications, wherein the N is a preset positive integer, and identify the top N applications of highest CPU occupancy rate as the target applications.

The one or more computer programs further include computer-executable instructions that, when executed by the one or more processors, cause the electronic device to obtain a corresponding decision result of each target application through a decision tree model based on the feature data corresponding to each target application, and identify the target abnormal application from among the target applications based on the decision results.

In accordance with another aspect of the disclosure, one or more non-transitory computer-readable storage media storing computer-executable instructions that, when executed by a processor individually or collectively, cause an electronic device to perform operations are provided. The operations include obtaining feature data corresponding to a plurality of running applications, wherein the feature data comprises current system state data and running state data corresponding to the at least one application, identifying a target abnormal application based on the feature data corresponding to the plurality of the running applications, obtaining interactive data corresponding to a plurality of call actions of the target abnormal application within a preset duration, identifying a target abnormal call action based on the interactive data corresponding to the plurality of the call actions, and performing call restriction on the target abnormal call action based on monitoring the target abnormal call action.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is a schematic diagram of a null Q-value table shown according to an embodiment of the disclosure;

The same reference numerals are used to represent the same elements throughout the drawings.

DETAILED DESCRIPTION

Figure 1:
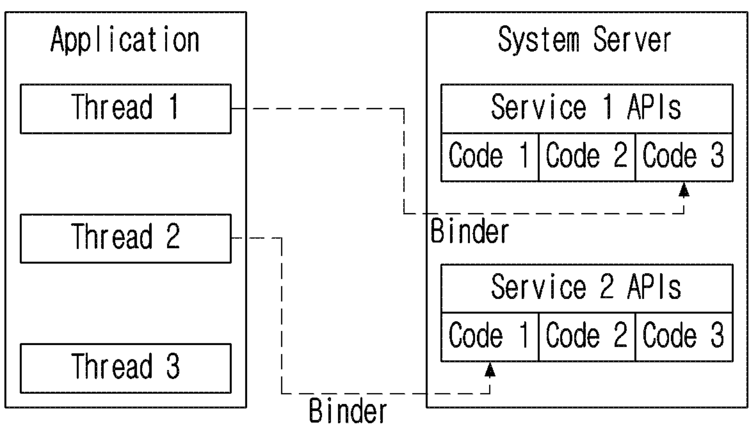
FIG. 1 is a schematic diagram of an application calling a system service through a Binder mechanism according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

It should be noted that, terms “first”, “second” and the like in the description, claims and the above drawings of the disclosure are used to distinguish similar objects, and need not be used to describe a specific order or sequential order. It should be understood that, such used data may be interchanged in appropriate situations so that the embodiments of the disclosure described herein may be implemented in an order other than those illustrated or described herein. Implementations described in the following embodiments do not represent all implementations consistent with the disclosure. On the contrary, they are only examples of devices and methods consistent with some aspects of the disclosure as detailed in the appended claims.

It should be noted herein that, “at least one of several items” appearing in the disclosure refers to three paratactic situations of “any one of the several items”, “any combination of any plurality of the several items” and “all of the several items”. For example, “including at least one of A and B”, that is, includes the following three paratactic situations (1) including A; (2) including B; (3) including A and B. For another example, “performing at least one of step One and step Two”, that is, represents the following three paratactic situations: (1) performing step One; (2) performing step Two; (3) performing step One and step Two.

With the development of mobile electronic terminals (such as a mobile phone, a tablet computer, or the like), more and more users choose to install varieties of applications (APP, also known as software or application) on the electronic terminals. The applications in the electronic terminals may call system services to implement various functions. For example, the applications in the electronic terminals may call system services through an inter-process communication mechanism (Binder mechanism) to achieve various functions.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a schematic diagram of an application calling a system service through a Binder mechanism according to an embodiment of the disclosure.

Referring to FIG. 1, the application (also understood as the Process in the application) contains Thread 1, Thread 2 and Thread 3, and the system service (System Server) contains Service 1 and Service 2 containing a corresponding function (Code) 1, function (Code) 2 and function (Code) 3, respectively, wherein Thread 1 calls Code 3 in Service 1 through one Binder, and Thread 2 calls Code 1 in Service 2 through one Binder, to implement corresponding functions in the application.

However, when the application calls the system service with an abnormal high frequency, it may lead to high load of CPU, and then generate high power consumption, which will make heating, lagging, fast power loss, and even restart of an electronic terminal.

For example, an application with a function of playing videos calls a system service interface “ConnectivityManager.getActiveNetworkInfo” at a frequency of more than 1000 times per second, which results in very high current consumption and brings a large system load. For another example, another application with a function of playing videos calls a system service interface “AudioManager.adjustStreamVolume” at a frequency of more than 200 times per second, which results in high current consumption, brings a larger system load, and generates a problem of restart.

In related technologies, in order to avoid the above problems, a restriction on CPU frequency, and even a manner of forcing closing the application under certain situations, is adopted. However, this may lead to further lagging of the electronic terminal, and affect user experience.

In order to address the issues existing in the above related technologies, the disclosure proposes an application running method, apparatus, electronic device and storage medium, by determining a target application which is abnormal(target abnormal application) based on current running data of an electronic terminal, determining a target call action among call actions (Binder) of the target abnormal application, performing restriction on the target call action in a case that it is predicted that the target call actions is abnormal, it is able to capture applications of which system services are called with an abnormal high frequency, and locate the abnormal Binder accurately, so as to address the issues of high load and high current consumption, while improving the situation of heating and lagging, and improve user experience.

The "running" may be described as "executing" or "activating".

Below, an application running method, apparatus, electronic device and storage medium according to the disclosure will be described in detail with reference to FIGS. 2 to 14.

Figure 2:
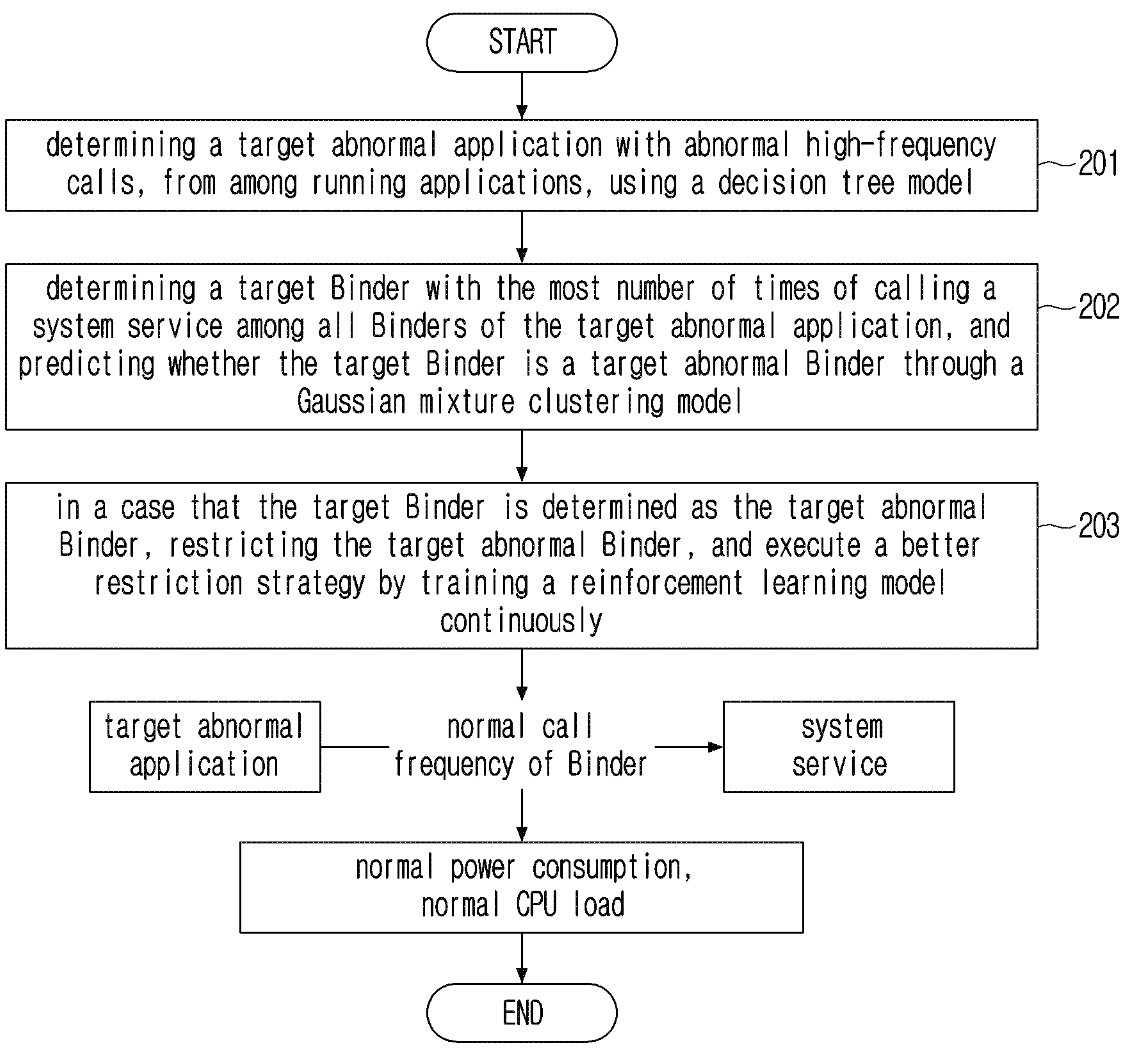
FIG. 2 is an overall frame diagram of an application running method according to an embodiment of the disclosure.

FIG. 2 is an overall frame diagram of an application running method according to an embodiment of the disclosure.

Referring to FIG. 2, in operation 201, a shallow detection may be performed, which is determining a target abnormal application(s) with abnormal high-frequency calls, from among running applications, using a decision tree model.

In operation 202, a deep detection may be performed, which is determining a target Binder with the most number (of times) of calling a system service among all Binders of the target abnormal application, and predicting whether the target Binder is abnormal through a Gaussian mixture clustering model, i.e., predicting whether the target Binder is a target abnormal Binder.

In operation 203, in a case that the target Binder is determined as the target abnormal Binder, the target abnormal Binder may be restricted, and a better restriction strategy may be executed by training the reinforcement learning model continuously.

Based on the above operations 201 to 203, a call frequency of the Binder of the target abnormal application may be restored to normal, thereby addressing the issues of high load and high power consumption, and achieve a normal power consumption and normal CPU load.

The application running method of the disclosure will be described in detail below based on the overall framework shown in FIG. 2.

Figure 3:
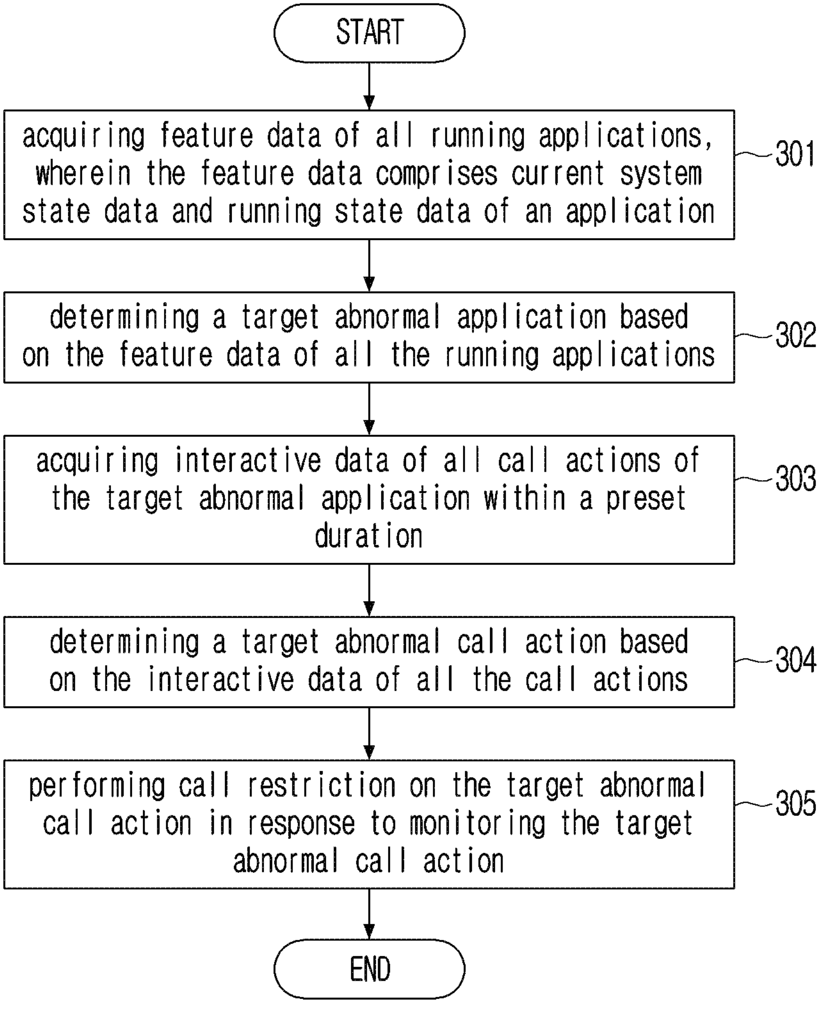
FIG. 3 is a flowchart of an application running method according to an embodiment of the disclosure.

FIG. 3 is a flowchart of an application running method according to an embodiment of the disclosure. The process shown in FIG. 3 may be executed by an electronic terminal, for example, the process shown in FIG. 3 may be created as a system service process of the electronic terminal, which may be automatically executed when the electronic terminal is starting up.

Referring to FIG. 3, in operation 301, feature data of all running applications may be acquired. Here, the feature data may include current system state data and running state data of an application.

According to an embodiment of the disclosure, the electronic terminal may be, but is not limited to, an apparatus that may install various applications, such as a mobile phone, a tablet computer, or the like, an operating system on the electronic terminal may be, but is not limited to, Android; the running applications may be, but are not limited to, third-party application (3rd APP).

According to an embodiment of the disclosure, the system state data may include, but not limited to, at least one of: a CPU occupancy rate of system service processes (system CPU usage), the lowest current consumption value of apparatus (bottom current), an average current consumption value of apparatus (average current), an average CPU occupancy rate of apparatus (average Total CPU usage), whether there is a touch event in the last 5 seconds (during touch), an average CPU frequency of apparatus (average CPU frequency), the lowest CPU frequency of apparatus (bottom CPU frequency). The running state data of the application may include, but not limited to, a CPU occupancy rate of application (APP CPU Usage). It should be noted that the plurality of parameters above are statistical values of parameters over a period of time. For example, the average current consumption value of apparatus is an average current consumption value of apparatus over a period of time.

In operation 302, a target abnormal application(s) may be determined based on the feature data of all the running applications. Here, the abnormal applications may refer to an application that calls system services with a high frequency.

According to an embodiment of the disclosure, first, a target application(s) may be determined from among all the running applications based on the running state data of all the running applications. For example, the running state data may include, but not limited to, a CPU occupancy rate of the running applications. Based on this, the top N applications of highest CPU occupancy rate may be determined from among all the running applications, wherein the N is a preset positive integer, for example, but not limited to, all the running applications are ranked in a descending order of corresponding CPU occupancy rates, and the top N applications are selected in order, wherein a value of N may be taken as 3.

Then, the target abnormal application(s) may be determined from among the target application(s) based on feature data of the target application(s). Here, it may be determined that whether the running state data of a target application and the current system state data are abnormal, and if so, it is determined that this target application is a target abnormal application. For example, a corresponding decision result of each target application may be obtained through a decision tree model based on the feature data of each target application, the target abnormal application(s) may be determined from among the target application(s) based on the decision results. Specifically, for each of the target application(s), the running state data of each target application and the current system state data may be input into the decision tree model to obtain the decision result that whether each target application is abnormal, and whether each target application is a target abnormal application may be determined based on the decision result. According to the embodiment of the disclosure, performing a shallow detection based on the decision tree model may make a screening on whether the target application is abnormal, inputs of the decision tree model are the running state data of the target applications and the current system state data which may be directly read, which will not cause additional load and will not interfere with the running of the target applications, which may avoid system resource consumption and load caused by performing a deep detection directly.

As an example, the determination by the decision tree model may be performed for multiple times, and whether each target application is a target abnormal application may be determined based on the multiple times of decision results. For example, the running state data of each target application and the system state data may be acquired at a certain time interval (for example, 10 s) and input into the decision tree model, and then it is determined that a corresponding target application is a target abnormal application if three times of consecutive decision results are abnormal.

According to an embodiment of the disclosure, the decision tree model for determining the target abnormal application(s) from among the target application(s) may be pre-trained. Below, the training process of the decision tree model is set forth:

First, a first training sample set may be obtained, wherein each training sample in the first training sample set includes a plurality of feature data of one application and a label indicating whether there is an abnormality, wherein the plurality of feature data includes system state data and running state data when this application is running.

Here, the plurality of feature data may be described in the above embodiments: the CPU occupancy rate of system service processes, the CPU occupancy rate of application, the lowest current consumption value of apparatus, the average current consumption value of apparatus, the average CPU occupancy rate of apparatus, whether there is a touch event in the last 5 seconds, the average CPU frequency of apparatus, and the lowest CPU frequency of apparatus. For example, in one embodiment of the disclosure, the first training sample set may be represented as the following Table 1:

56-72% and >72%, the CPU occupancy rate of application may be divided into three grades of <56%, 56-72% and >72%, the lowest current consumption of apparatus may be divided into three grades of <400 mA, 400-500 mA and >500 mA, and the average current consumption of apparatus may be divided into three grades of <500 mA, 500-600 mA and >600 mA, the average CPU occupancy rate of apparatus may be divided into three grades of <100%, 100-150% and >150%, whether there is a touch event in the last 5 seconds may be divided into two grades of Yes and No, the average CPU frequency of apparatus (percentage) may be divided into three grades of <70%, 70-80% and >80%, the lowest CPU frequency of apparatus (percentage) may be divided into three grades of <60%, 60-70% and >70%.

(1-B), an entropy value Ent(S) of a root node may be calculated according to the following Equation 1:

$$Ent(S)=E\left(\frac{100}{500},\frac{400}{500}\right)=-\frac{100}{500}\log_2\frac{100}{500}-\frac{400}{500}\log_2\frac{400}{500}=e1 \quad \text{Equation 1}$$

(1-C), entropy gains of each feature data may be calculated, respectively, and the entropy gains of each feature data may be determined by calculating the entropy values of each grade of the corresponding feature data.

For example, an entropy gain of the CPU occupancy rate of system service processes may be determined by calculating the entropy values of the three grades of <56%,

TABLE 1

Schematic table of the first training sample set

| training sample | CPU occupancy rate of system | CPU occupancy rate of application | lowest current consumption value (mA) | average current consumption value (mA) | average CPU occupancy rate | whether there is a touch event | average CPU frequency (percentage) | lowest CPU frequency (percentage) | label |
|---|---|---|---|---|---|---|---|---|---|
| 1 | >72% | >72% | >500 | >600 | >150% | No | >80% | >70% | abnormal |
| 2 | >72% | 56~72% | >500 | >600 | 100~150% | No | >80% | >70% | abnormal |
| 3 | <56% | <56% | <400 | <400 | <100% | No | <70% | <60% | normal |
| 4 | <56% | 56~72% | <400 | 400~500 | <100% | Yes | <70% | <60% | normal |
| . . . | . . . | . . . | . . . | . . . | . . . | . . . | . . . | . . . | . . . |

Then, a decision tree model may be built based on the first training sample set and with the plurality of feature data as nodes. Here, the decision tree model may be a C4.5 decision tree model. The embodiment of the disclosure may build the decision tree model layer by layer based on the entropy gain rate, according to the first training sample set.

Below, the process of building the decision tree model through a specific embodiment (including steps 1-A to 1-N) (the number of training samples, the number of positive examples, the number of negative examples, and a threshold of grading in the following embodiments are only illustrative, and the disclosure is not limited to this) may be set forth:

In this embodiment of the disclosure, the first training sample set contains 500 training samples, wherein there are 100 training samples of which the label is abnormal (i.e., negative examples), and there are 400 training samples of which the label is not abnormal, or normal (i.e., positive examples).

(1-A), each feature data may be graded according to a size of value. Specifically, the CPU occupancy rate of system service processes may be divided into three grades of <56%, 56~72% and >72%. Then, First, it is need to determine the number of positive examples and the number of negative examples contained in the three grades, that is, determine that there are 250 training samples of the CPU occupancy rate of system service processes of <56% (10 positive examples, and 240 negative examples), and there are 130 training samples of the CPU occupancy rate of system service processes between 56~72% (30 positive examples, 100 negative examples), there are 120 training samples of the CPU occupancy rate of system service processes of >72% (60 positive examples and 60 negative examples); then determine, by the following Equations 2 to 4, the entropy value Ent(D11) of the CPU occupancy rate of system service processes of <56%, the entropy value Ent (D12) of the CPU occupancy rate of system service processes between 56%~72%, and the entropy value Ent(D13) of the CPU occupancy rate of system service processes >72%, and finally calculate the entropy gain Gain(D1) of the CPU occupancy rate of system service processes by the following Equations 2 to 5.

$$Ent(D11) = -\frac{10}{250}\log_2\frac{10}{250} - \frac{240}{250}\log_2\frac{240}{250} = d11 \quad \text{Equation 2}$$

$$Ent(D12) = -\frac{30}{130}\log_2\frac{30}{130} - \frac{100}{130}\log_2\frac{100}{130} = d12 \quad \text{Equation 3}$$

$$Ent(D13) = -\frac{60}{120}\log_2\frac{60}{120} - \frac{60}{120}\log_2\frac{60}{120} = d13 \quad \text{Equation 4}$$

$$\text{Gain}(D1) = e1 - d11 * \frac{250}{500} - d12 * \frac{130}{500} - d13 * \frac{120}{500} = g1 \quad \text{Equation 5}$$

Using the same calculation processes as those of the entropy gain of the CPU occupancy rate of system service processes, an entropy gain of the CPU occupancy rate of application g2, an entropy gain of the lowest current consumption value of apparatus g3, an entropy gain of the average current consumption value of apparatus g4, an entropy gain of the average CPU occupancy rate of apparatus g5, an entropy gain of whether there is a touch event in the last 5 seconds g6, an entropy gain of the average CPU frequency of apparatus g7, an entropy gain of the lowest CPU frequency of apparatus g8, may be determined.

(1-D), an average entropy gain of each feature data may be calculated by the following equation 6:

$$\text{Gain(average)} = \frac{g1 + g2 + g3 + g4 + g5 + g6 + g7 + g8}{8} = g0 \quad \text{Equation 6}$$

(1-E), the entropy gain of the feature data that is greater than the average entropy gain may be determined among the entropy gains of the above feature data. In this embodiment of the disclosure, the entropy gain of feature data that is greater than the average entropy gain is the entropy gain of the CPU occupancy rate of system service processes g1 and the entropy gain of the lowest current consumption value of apparatus g3.

(1-F), an entropy gain rate GainR(D1) of the CPU occupancy rate of system service processes may be calculated by the following Equations 7 and 8:

$$GainR(D1) = \frac{g1}{i1} = r1 \quad \text{Equation 7}$$

wherein, $$i1 = -\frac{250}{500}\log_2\frac{250}{500} - \frac{130}{500}\log_2\frac{130}{500} - \frac{120}{500}\log_2\frac{120}{500} \quad \text{Equation 8}$$

Using the same calculation process as that of the entropy gain rate of the CPU occupancy rate of system service processes, an entropy gain rate r2 of the lowest current consumption value of apparatus may be determined.

(1-G), a size relationship between r1 and r2 may be determined, and feature data corresponding to the larger one may be taken as a node of a first layer of the decision tree model (it should be noted that in the case of r1=r2, any either of them may be taken as the node of the first layer). In this embodiment of the disclosure, r1>r2, so the CPU occupancy rate of system service processes may be taken as the node of the first layer of the decision tree model.

Figure 4:
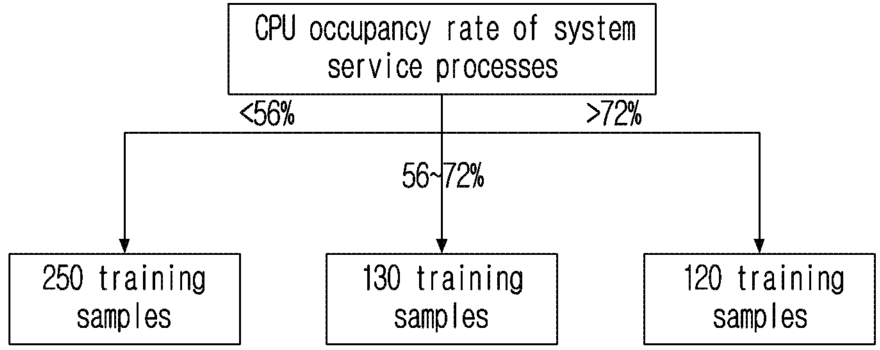
FIG. 4 is a schematic diagram of a node of a first layer of a decision tree model according to an embodiment of the disclosure.

FIG. 4 is a schematic diagram of a node of a first layer of a decision tree model according to an embodiment of the disclosure. The node of the first layer in this embodiment may refer to FIG. 4.

Referring to FIG. 4, (1-H), a node of a second layer of the decision tree model may be determined. Specifically, referring to FIG. 4, there are 250 training samples of the CPU occupancy rate of system service processes of <56%, wherein 10 training samples are positive examples and 240 training samples are negative examples. The process of determining the node of the second layer may be described by taking this branch as an example below.

(1-I), an entropy value Ent(S) of a root node of this branch of the CPU occupancy rate of system service processes of <56% may be determined by the following Equation 9:

$$Ent(S) = E\left(\frac{10}{250}, \frac{240}{250}\right) = -\frac{10}{250}\log_2\frac{10}{250} - \frac{240}{250}\log_2\frac{240}{250} = e21 \quad \text{Equation 9}$$

(1-J), entropy gain of each feature data of this branch other than the CPU occupancy rate of system service processes may be calculated in the same manner as the above manners for determining the entropy gain: determining an entropy gain of the CPU occupancy rate of application g21, an entropy gain of the lowest current consumption value of apparatus g22, an entropy gain of the average current consumption value of apparatus g23, an entropy gain of the average CPU occupancy rate of apparatus g24, an entropy gain of whether there is a touch event in the last 5 seconds g25, an entropy gain of the average CPU frequency of apparatus g26, and an entropy gain of the lowest CPU frequency of apparatus g27.

(1-K), an average entropy gain of each feature data of this branch may be calculated by the following Equation 10:

$$\text{Gain(average)} = \frac{g21 + g22 + g23 + g24 + g25 + g26 + g27}{7} = g20 \quad \text{Equation 10}$$

(1-L), an entropy gain of feature data that is greater than the average entropy gain may be determined among the entropy gain of each feature data of this branch. In this embodiment of the disclosure, the entropy gain of the feature data that is greater than the average entropy gain is the entropy gain of the CPU occupancy rate of application g21, the entropy gain of the lowest current consumption value of apparatus g22, and the entropy gain of the lowest CPU frequency of apparatus g27.

(1-M), using the same manner as the above manner of determining the entropy gain rate, the entropy gain rate of the CPU occupancy rate of application, the entropy gain rate of the lowest current consumption value of application, and the entropy gain rate of the lowest CPU frequency of application may be calculated, respectively, and feature data corresponding to the larger one may be taken as a root node of this branch, that is, the node of the second layer of the decision tree model. In this embodiment of the disclosure, the lowest current consumption value of the equipment is determined as the root node of this branch.

Figure 5:
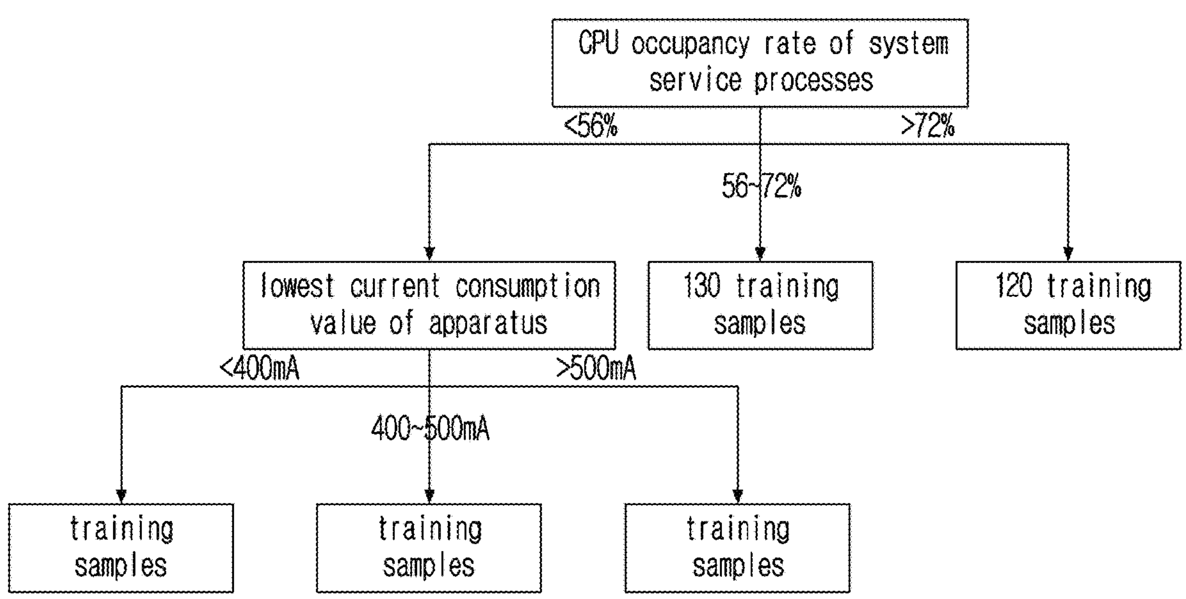
FIG. 5 is a schematic diagram of a node of a second layer of a decision tree model shown according to an embodiment of the disclosure.

FIG. 5 is a schematic diagram of a node of a second layer of a decision tree model shown according to an embodiment of the disclosure. The node of the second layer in this embodiment may refer to FIG. 5.

(1-N), building of the decision tree model may be completed by referring to the above processes of building the nodes of the first and second layers of the decision tree model.

Figure 6:
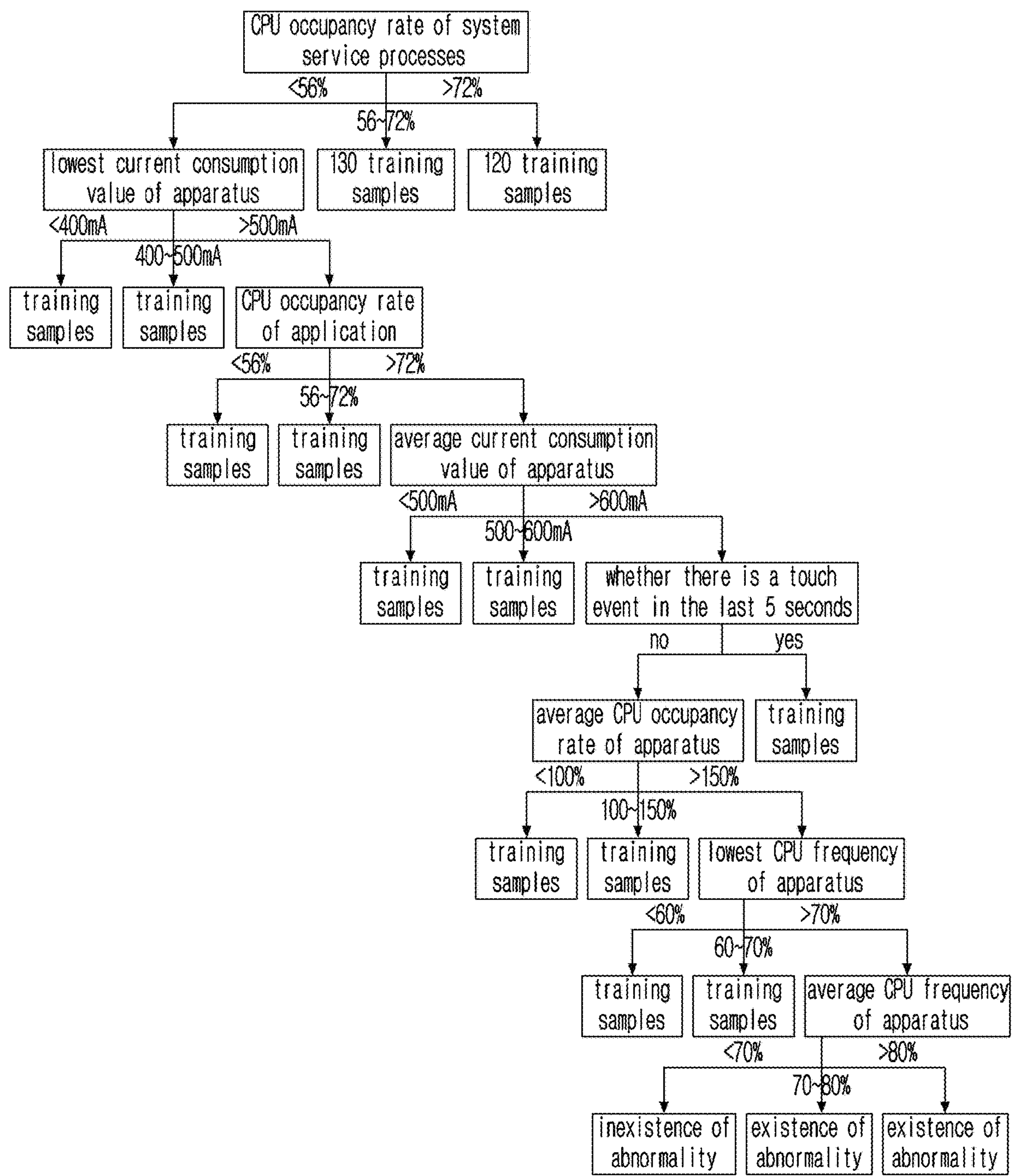
FIG. 6 is a schematic diagram of partial nodes of a decision tree model according to an embodiment of the disclosure.

FIG. 6 is a schematic diagram of partial nodes of a decision tree model shown according to an embodiment of the disclosure. The decision tree model in this embodiment may refer to FIG. 6.

According to the an embodiment of the disclosure, the above trained decision tree model may be continuously updated by self-learning during the process of using an electronic terminal. A label indicating whether a decision result corresponding to a target application obtained through the decision tree model is correct is acquired, and the decision tree model is updated based on this label and the feature data of the target abnormal application. Specifically, a plurality of updating samples may be acquired, and then the decision tree model may be updated based on the plurality of updating samples, wherein each updating sample may include a plurality of feature data of one application and a label indicating whether the decision result of the decision tree model is correct for the application.

As an example, an updating sample related to a target application may be acquired, wherein the updating sample related to the target application includes a plurality of feature data of the target application and a label indicating whether the decision result of the decision tree model is correct, wherein whether the decision result of the decision tree model is correct may be determined by a prediction result obtained after performing operation 305 in the process as shown in FIG. 3. For example, it is possible that the label indicates that the decision result of the decision tree model is correct in a case that the target call action is predicted to be abnormal, and the label indicates that the decision result of the decision tree model is wrong in a case that the target call action is predicted that there is no abnormality. On this basis, after the plurality of updating samples are obtained by performing application running methods as shown in FIG. 3 for multiple times, the decision tree model may be updated based on the plurality of obtained updating samples. Here, the manner of updating the decision tree model may include, but not limited to, post-pruning the decision tree model. According to the embodiment of the disclosure, updating the decision tree model based on the updating samples may improve a decision accuracy of the decision tree model.

As an example, the decision tree model may be updated for many times with the use of the electronic apparatus, for example, but not limited to, updating at preset time intervals, and updating every time a preset number of updating samples are acquired.

The process of updating the decision tree model shown in FIG. 6 based on the plurality of updating samples may be set forth through a specific embodiment (including steps 2-A to 2-E) below:

(2-A), 100 updating samples may be acquired (wherein, there are 80 updating samples of which a label indicates a decision result to be correct, 20 updating samples of which a label indicates a decision result to be wrong, and a decision accuracy of 100 updating samples is 80%). Wherein partial updating samples may be represented as the following Table 2:

In a case that both the decision result and the real result are abnormal (or both are normal), the label of the updating sample indicates that the decision result of the decision tree model is correct. In a case that the decision result is abnormal and the real result is normal (or the decision result is normal and the real result is abnormal), the label of the updating sample indicates that the decision result of the decision tree model is wrong.

(2-B3), referring to FIG. 6, the updating samples under the node branch of the average CPU frequency of application may be determined. In this embodiment of the disclosure, there are 20 updating samples under this branch, and there are 6 updating samples of which the decision result is not abnormal (wherein, there is one updating sample of which the label indicates that the decision result of the decision tree model is correct, and there are 5 updating samples of which the label indicates that the decision result of the decision tree model is wrong), there are 14 updating samples of which the decision result is abnormal (wherein, there are 13 updating samples of which the label indicates the decision result of the decision tree model is correct, and there is one updating sample of which the label indicates that the decision result of the decision tree model is wrong).

(2-C), a decision accuracy before precise under this branch may be determined by the following Equation 11:

$$\text{before precise} = \frac{(80 - 1 - 13) + (1 + 13)}{100} = 80\% \quad \text{Equation 11}$$

If the node of the average CPU frequency of application is replaced by: existence of abnormality, the decision accuracy after precise after replacement may be determined by the following Equation 12:

$$\text{after precise} = \frac{(80 - 1 - 13) + (5 + 13)}{100} = 84\% \quad \text{Equation 12}$$

Based on the above Equations 11 and 12, it may be seen that the decision accuracy is improved, then the node of the average CPU frequency of application may be pruned, replaced by existence of abnormality, and its branches may be deleted.

(2-D), referring to FIG. 6, the decision accuracy, after replacing the node of the lowest CPU frequency of application by existence or inexistence of abnormality, may be determined, and this decision accuracy may be compared with 84%, the node of the lowest CPU frequency of application is not pruned if the decision accuracy remains unchanged or decreases, it is pruned if the decision accuracy increases.

TABLE 2

Schematic table of partial updating samples

| updating sample | CPU occupancy rate of system | CPU occupancy rate of application | lowest current consumption value (mA) | average current consumption value (mA) | average CPU occupancy rate | whether there is a touch event | average CPU frequency (percentage) | lowest CPU frequency (percentage) | decision result | real result |
|---|---|---|---|---|---|---|---|---|---|---|
| 1 | >72% | >72% | >500 | >600 | >150% | No | >80% | >70% | abnormal | abnormal |
| 2 | >72% | <56% | >500 | >600 | 100~150% | Yes | 70-80% | 60-70% | abnormal | normal |
| . . . | . . . | . . . | . . . | . . . | . . . | . . . | . . . | . . . | . . . | . . . |

(2-E), pruning is performed continuously based on the above pruning strategy, until pruning of all nodes at the last layer are completed (that is, pruning cannot be performed any more), to update the decision tree model.

Returning to FIG. 3, in operation 303, interactive data of all call actions of the target abnormal application within a preset duration may be acquired. Wherein, the call action refers calling any one function in a system service or other applications by any one thread in the target abnormal application. For example, the call action may include a first type of call action and a second type of call action, wherein first type of call action is calling any one function in a system service by any one thread in the target abnormal application, and the second type of call action is calling any one function in other applications by any one thread in the target abnormal application.

According to an embodiment of the disclosure, the call action may be, but not limited to, a Binder. Then, the target abnormal application may be monitored and Systrace actions within a certain range of time (such as 10 s) may be turned on, to capture its Binder data.

As an example, two keywords of binder_driver and binder_lock may be used to capture the Binder data. For example, in one embodiment of the disclosure, the partial captured Binder data may be represented as the following code:

```
VolumeDialogCon-3039 (2384)[002]....275825.902019:
binder_transaction: transaction=157059329 dest_node=13415
dest_proc=1136 dest_thread=0 reply=0 flags=0x12 code=0x83
Binder:1136_8-2407 (1136)[002]....275825.903039:
binder_transaction: transaction=157059340 dest_node=0 dest_proc=2384
dest_thread=3039 reply=1 flags=0x0 code=0x0
```

Wherein, VolumeDialogCon-3039 represents a process identity (ID) of the target abnormal application, 2384 represents a thread ID in the target abnormal application corresponding to this Binder, reply=0 represents a sender, code=0x83 represents a function in the system service corresponding to this Binder, dest_proc=1136 indicates the system service.

Wherein Binder:1136_8-2407 indicates a process ID of the system service corresponding to this Binder, and reply=1 indicates a receiver.

In operation 304, a target abnormal call action(s) may be determined based on the interactive data of all the call actions. One or more target abnormal call actions may be determined based on the interactive data of all the call actions. The application running method of the disclosure is described below by taking one target abnormal call action as an example.

According to an embodiment of the disclosure, the interactive data may include a number (of times) of calls of a call action within a preset duration. First, the first type of call actions may be screened from among all the call actions; then the first type of call action with the most number of calls may be determined as a target call action; finally, the target abnormal call action may be determined based on the number of calls of the target call action within the preset duration.

As an example, in a case that the process ID of the target abnormal application is VolumeDialogCon-3039, Binders of which the process IDs are VolumeDialogCon-3039, reply=0, dest_proc=1136 may be determined from among all the call actions, as the first type of call action, and a number of calls of each first type of call action within the preset duration (such as 2 s) is counted at the same time; then, a first type of call action with the most number of calls is determined among all the first type of call actions as the target call action.

Figure 7:
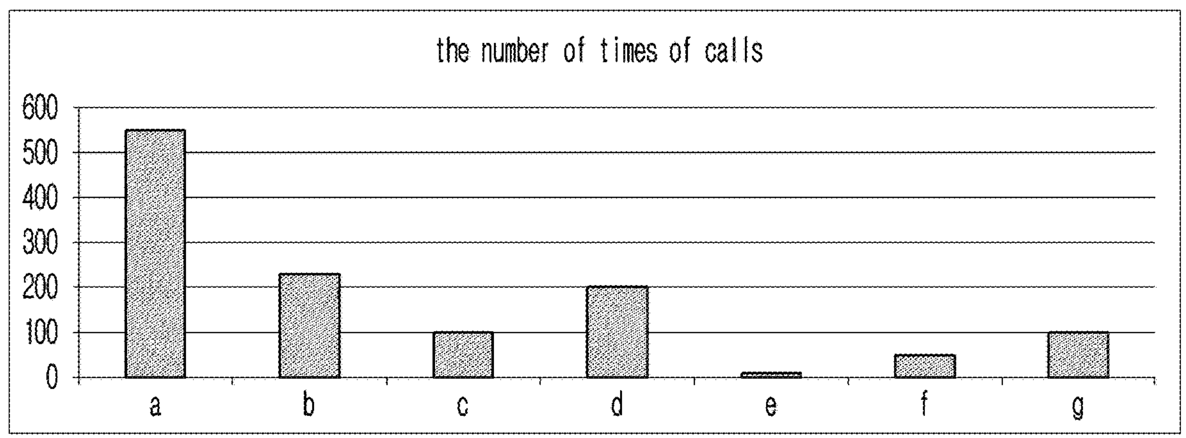
FIG. 7 is a schematic diagram of a number (of times) of calls of a first type of call action according to an embodiment of the disclosure.

FIG. 7 is a schematic diagram of a number (of times) of calls of a first type of call action shown according to an embodiment of the disclosure.

Referring to FIG. 7, an ordinate is the number of calls within a preset duration, a, b, c, d, e, f, g are the first type of call actions, and the first type of call action with the most number of calls is a (550 times). According to the number of calls of the call action a within the preset duration, whether call action a is the target abnormal call action is determined.

According to an embodiment of the disclosure, it is possible to predict whether the target call action is abnormal through a Gaussian mixture clustering model. An abnormal probability of the target call action may be obtained through the Gaussian mixture clustering model based on the number of calls of the target call action within the preset duration, the target call action is determined as the target abnormal call action in response to the abnormal probability being higher than a preset threshold. Specifically, first, the number of calls of the target call action within the preset duration may be acquired; then, the number of calls of the target call action within the preset duration may be input into the Gaussian mixture clustering model, to obtain a probability, predicted by the Gaussian mixture clustering model, that the target call action is abnormal; finally, the target call action of which the abnormal probability is higher than the preset threshold may be determined as the target abnormal call action. For example, but not limited to, if the preset threshold is 70%, the target call action of which the abnormal probability is higher than 70% is determined as the target abnormal call action, and the target call action of which the abnormal probability is not higher than 70% is determined that there is no abnormality, that is, as a normal call action. If it is determined that the target call action is not abnormal, there is no need to perform call restriction on this target call action subsequently.

According to an embodiment of the disclosure, the Gaussian mixture clustering model for predicting the abnormal probability of the target call actions may be pre-trained. The training process of Gaussian mixture clustering model is described below:

First, a second training sample set may be acquired, wherein each training sample in the second training sample set includes a number of times (that) the first type of call action with the most number of times is called by one application within a preset duration, wherein the first type of call action is calling any one function in the corresponding system service by any one thread in the application.

Then, based on the second training sample set, the Gaussian mixture clustering model may be trained with a probability as an output, which is a probability that the number of calls of the first type of call action within the preset duration is in each of a plurality of preset clusters (Gaussian cluster), wherein the plurality of preset clusters at least includes: existence of abnormality and inexistence of abnormality.

The embodiment of the disclosure may use a maximum expectation algorithm (EM) to divide the second training sample set into the plurality of preset clusters, and then calculate means and variances of each cluster, so as to obtain probability density functions of each cluster, and complete the training of the Gaussian mixture clustering model.

The process of training the Gaussian mixture clustering model is set forth through a specific embodiment (including steps 3-A to 3-E) below:

(3-A), the second training sample set may be acquired, wherein, each training sample in the second training sample set includes the number of times (that) the first type of call action with the most number of times is called by one application within the preset duration, wherein the first type of call action is calling any one function in the corresponding system service by any one thread in the application.

Figure 8:
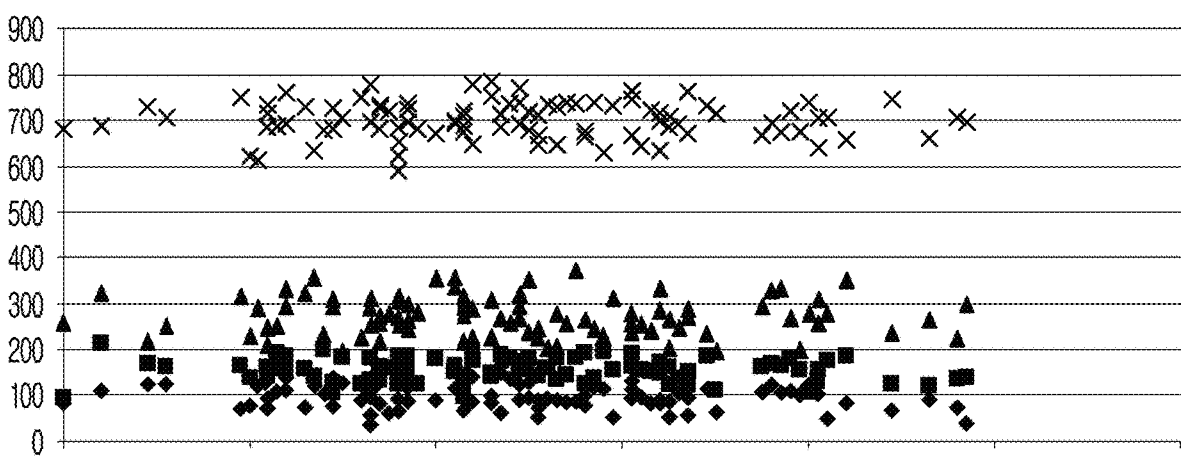
FIG. 8 is a scatter plot of a number (of times) of calls in a second training sample set according to an embodiment of the disclosure.

(3-B), FIG. 8 is a scatter plot of a number (of times) of calls in a second training sample set according to an embodiment of the disclosure. Referring to FIG. 8, the scatter points are clustered into two clusters, scatter points on the upper side may be divided as existence of abnormality, and scatter points on the lower side may be divided as inexistence of abnormality, and the scatter points on the lower side may be further divided into three parts, namely, triangular scatter points, rectangular scatter points and rhombic scatter points, respectively. In the above embodiments of the disclosure, it is known that the abnormality may be a high-frequency calling system service, so the scatter points on the upper side (that is, the part of existence of abnormality) may be divided as abuse (cluster), the triangle scatter points may be divided as high-use (cluster), the rectangular scatter points may be divided as medium-use (cluster), and rhombic scatter points may be divided as low-use (cluster). It should be noted here that, it is only illustrative to divide into the four clusters as shown in this step and name them as abuse, high-use, medium-use and low-use, respectively. The disclosure is not limited to this, but also protects other division manners, for example, of division into two clusters of existence of abnormality and inexistence of abnormality as in the above embodiment.

(3-C), initial prior probabilities, initial means, initial standard deviations of each of the four clusters may be determined, and an initial variance matrix is determined. In this embodiment of the disclosure, the initial prior probabilities of low-use (cluster), medium-use (cluster), high-use (cluster) and abuse (cluster) are p1=0.4, p2=0.3, p3=0.2 and p4=0.1, respectively, the initial mean values are u1=40, u2=80, u3=120 and u4=500 respectively, the initial standard deviations are e1=15, e2=20, e3=25 and e4=200 respectively, and the initial variance matrix is mat0=[p1, p2, p3, p4, u1, u2, u3, u4, e1, e2, e3, e4].

(3-D), at least one round of iteration may be carried out for all training samples in the second training sample set through the following Equations 13 to 16, based on the above initial prior probabilities, initial means and initial standard deviations:

$$p(x \mid \mu, \varepsilon^2) = \frac{1}{\sqrt{2\pi}\,\varepsilon} e^{-\frac{(x-\mu)^2}{2\varepsilon^2}} \quad \text{Equation 13}$$

$$\rho_k = \frac{1}{N}\sum_{i=1}^{N} Y(i, k) \quad \text{Equation 14}$$

$$\mu_k = \frac{1}{N}\sum_{i=1}^{N} Y(i, k)x_i \quad \text{Equation 15}$$

$$\varepsilon_k = \frac{1}{N}\sum_{i=1}^{N} Y(i, k)(x_i - \mu_k)^2 \quad \text{Equation 16}$$

Among them, the Equation 13 calculates a Gaussian probability density, the Equation 14 calculates a proportion, the Equation 15 calculates a mean, and the Equation 16 calculates a standard deviation.

Wherein x is the number of calls corresponding to the training sample in the second training sample set, μ is a mean, $\varepsilon^2$ is a variance, E is a standard deviation, $\rho_k$ is a proportion of the k-th cluster (of the current round of iteration), N is the number of training samples in the second training sample set, $\mu_k$ is the mean of the k-th cluster (current round of iteration), $x_i$ represents the number of calls corresponding to the i-th training sample, $\varepsilon_k$ is a standard deviation of the k-th cluster (current round of iteration), $Y(i, k)=\rho_k'*p(x|\mu, \varepsilon^2)$, $\rho_k'$ represents a proportion of the k-th cluster corresponding to a previous round of iteration.

It should be noted that in each round of iteration, first, probabilities of each training sample in each of the four clusters are calculated using prior probabilities, means and standard deviations (a sum of the four probabilities is 1), and then posterior probabilities, means and standard deviations are obtained; then a deviation between a prior variance matrix and a posterior variance matrix is compared, the iteration may be stopped in a case that the deviation is less than 0.001, otherwise, the prior probabilities, means and standard deviations may be updated and a next round of iteration is carried out, until the preset number of iterations is completed.

(3-E) after the iteration is finished, final means and final standard deviations of each of the four clusters may be obtained. In this embodiment of the disclosure, the final means of low-use (cluster), medium-use (cluster), high-use (cluster) and abuse (cluster) are u1=50, u2=100, u3=150 and u4=700, respectively, and the final standard deviations are e1=20, e2=25, e3=30 and e4=300, respectively.

Figure 9:
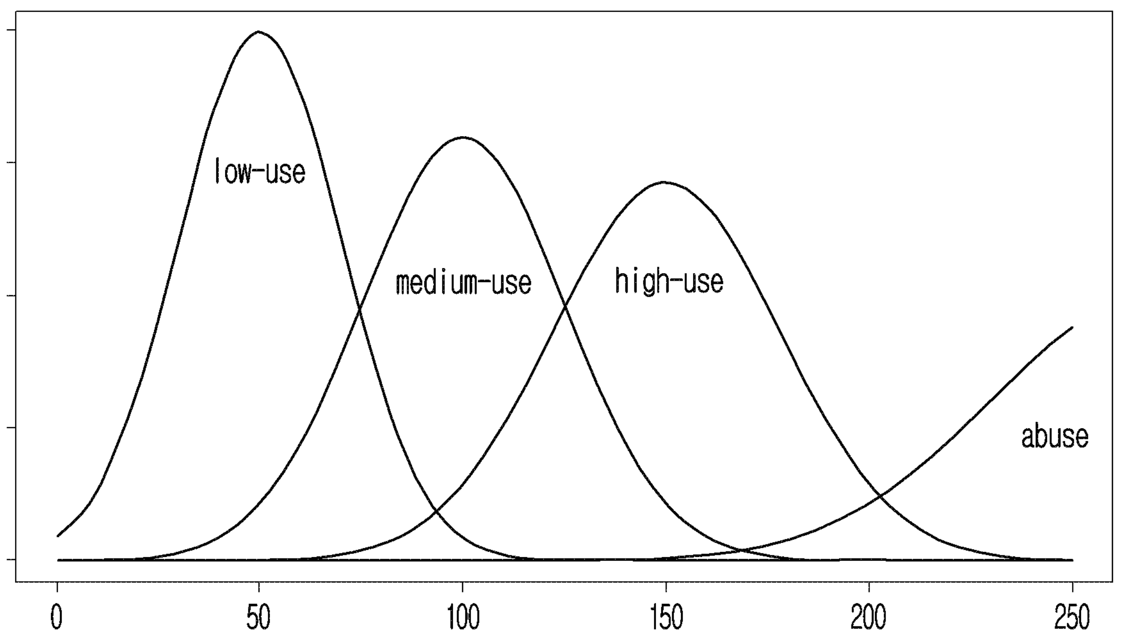
FIG. 9 is a schematic diagram of a Gaussian probability density function according to an embodiment of the disclosure.

FIG. 9 is a schematic diagram of a Gaussian probability density function according to an embodiment of the disclosure. The Gaussian probability density functions of each cluster may refer to FIG. 9.

Based on this, a probability of the number of calls in each cluster may be calculated by the following Equation 17:

$$p(x) = e^{-\frac{(x-\mu)^2}{2\varepsilon^2}} \quad \text{Equation 17}$$

Wherein x is the number of calls, μ and $\varepsilon^2$ represent the mean and variance corresponding to the same cluster.

For example, if the first type of call action a with the most the most number of calls (550 times) is determined in the above embodiment of the disclosure, then the probability that a (550 times) is in the abusing (cluster) may be determined by the following Equation 18:

$$p(550) = e^{-\frac{(550-700)^2}{2*300*300}} = 0.88 \quad \text{Equation 18}$$

Moreover, in the above embodiment of the disclosure, it is determined that the preset threshold is 0.7. Since 0.88 is greater than 0.7, it is determined that the target call action is abnormal.

Returning to FIG. 3, in operation 305, the target abnormal call action may be performed call restriction in response to monitoring the target abnormal call action.

According to an embodiment of the disclosure, the execution of the target abnormal call action may be suspended in response to monitoring the target abnormal call action, and the suspension of the target abnormal call action may be released after preset suspension time has elapsed. For example, in a case that the occurrence of the target abnormal call action is monitored, the execution of the target call actions may be suspended before the system service responds to the target call actions; after the preset suspension time has elapsed, the suspension of the target abnormal call action may be released. According to an embodiment of the disclosure, performing the restriction on the target abnormal call action based on the suspension time may significantly reduce the system load and power consumption.

According to an embodiment of the disclosure, the target abnormal call action and the preset suspension time may be added to a call action driver to execute, by the call action driver, at least one of: monitoring the occurrence of the target abnormal call action, suspending the execution of the target abnormal call action, and releasing the suspension of the target abnormal call action.

According to an embodiment of the disclosure, the call action may be, but is not limited to, a Binder. Then, a target abnormal Binder (including a process ID of the target abnormal application, a thread ID in the target abnormal application corresponding to the target abnormal Binder, and a function in the system service corresponding to the target abnormal Binder) and the preset suspension time, such as 5 ms (binder sleep time=5 ms) may be added to a Binder Driver in a kernel of the operating system, for example, but not limited to, may be added to a node of binder enable=true in the Binder Driver. Based on this, when the Binder driver monitors the occurrence of the target abnormal Binder (that is, the process ID, the thread ID and the function are the same as data added to the node), it will trigger the restriction operation on the target abnormal Binder, that is, suspending the execution of the target abnormal Binder, and releasing the suspension of the target abnormal Binder after 5 ms has elapsed.

According to an embodiment of the disclosure, when the preset suspension time is too long, it may cause a frame drop during the running process of the target abnormal application, and the types of applications are various, that is, there may be many situations about types of the determined target abnormal applications, performing a fixed suspension time may bring different power consumption changes and the number of frames changes for different applications. If the number of frames decreases too much, it will directly affect user experience. Based on this, in one embodiment of the disclosure, during the process of restriction on the target abnormal call action, the preset suspension time is adjusted for many times through a reinforcement learning model, based on power consumption data and performance data of the target abnormal application, to achieve an optimum suspension time. For example, the power consumption data and the performance data of the target abnormal application may be acquired, wherein the power consumption data and performance data are pre-sampled before the call restriction on the target abnormal call action and sampled during the call restriction on the target abnormal call action, a state parameter of the target abnormal application is determined based on the power consumption data and performance data of the target abnormal application, the state parameter of the target abnormal application is input into the reinforcement learning model to obtain a suspension time adjustment strategy output by the reinforcement learning model, and the suspension time is adjusted based on the suspension time adjustment strategy. In the above processes, the reinforcement learning model may be used to adjust the suspension time for many times, and after each adjustment of the suspension time, the target abnormal call action is restricted based on the adjusted suspension time at this time until the next adjustment of the suspension time, so as to balance the power consumption and performance (the number of frames). Here, the reinforcement learning model may be a Sarsa Learning model.

Figure 10:
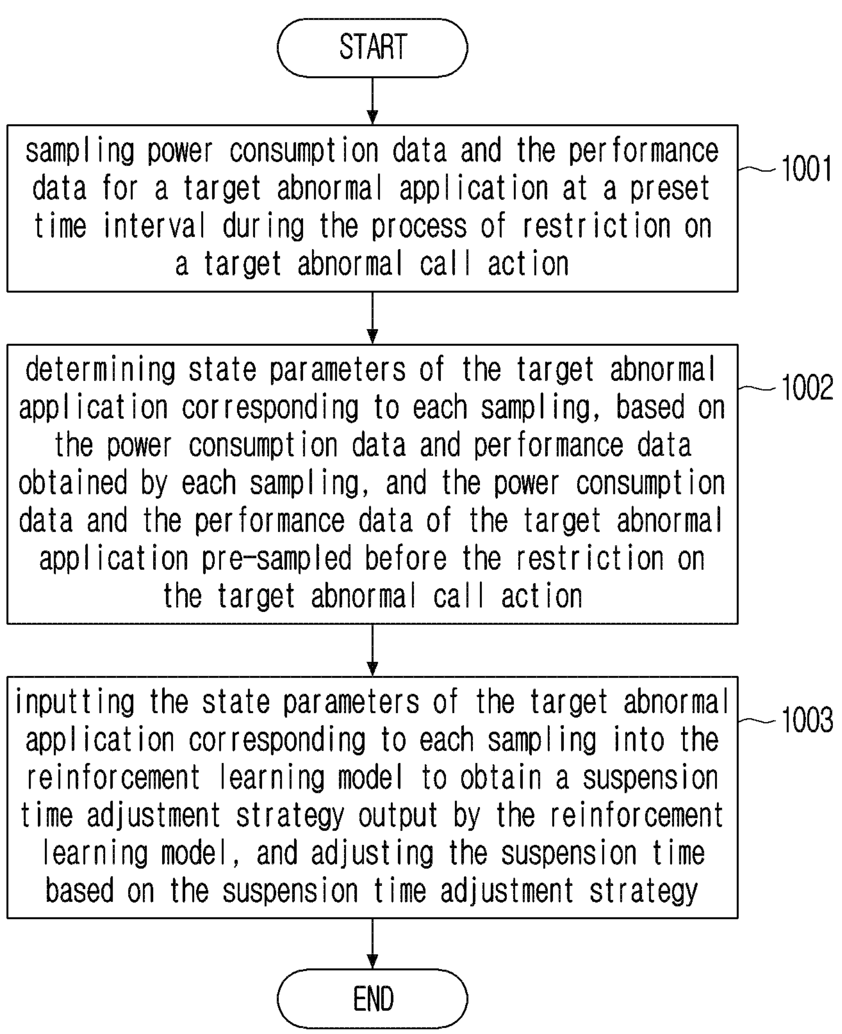
FIG. 10 is a flowchart for adjusting suspension time using a reinforcement learning model according to an embodiment of the disclosure.

FIG. 10 is a flowchart for adjusting suspension time using a reinforcement learning model according to an embodiment of the disclosure.

Referring to FIG. 10, in operation 1001, power consumption data and the performance data may be sampled for the target abnormal application at a preset time interval during the process of restriction on a target abnormal call action. Here, the power consumption data obtained by sampling may be, but not limited to, an average current consumption value of application (hereinafter also referred to as cps), the performance data obtained by sampling may be, but not limited to, an average frame rate of the target abnormal application (hereinafter also referred to as fps), and the preset time interval may be, but not limited to, 5 s.

In operation 1002, state parameters of the target abnormal application corresponding to each sampling may be determined, based on the power consumption data and performance data obtained by each sampling, and the power consumption data and the performance data of the target abnormal application pre-sampled before the restriction on the target abnormal call action.

The process of determining the state parameter through a specific embodiment (including steps 4-A to 4-E) is set forth below:

(4-A), an average current consumption value of apparatus rc and an average frame rate of the target abnormal application rf pre-sampled before the restriction on the target abnormal call action may be acquired.

(4-B), an average current target value tc=p*rc may be determined based on rc, and an average frame rate target value tf=q*rf may be determined based on rf, wherein p and q are preset proportion coefficients.

(4-C), a power consumption factor level Lcps=LC(cps, tc) may be determined based on rc, tc and cps, by referring to Table 3 below.

TABLE 3

Schematic table of power consumption factor level

| Lc | cps ≤ tc | tc < cps ≤ rc − bc | rc − bc < cps ≤ rc | rc < cps ≤ rc + bc | cps > rc + bc |
|---|---|---|---|---|---|
| $L_{cps}$ | 0 | 1 | 2 | 3 | 4 |
| explanation | ideal situation | close to ideal situation | adjustment in progress | away from the ideal situation | deterioration of the situation |

In the table, bc = (rc − tc)/2.

(4-D), a performance factor level Lfps=LF(fps, tf) may be determined based on tf and fps, by referring to Table 4 below.

TABLE 4

Schematic table of performance factor level

| Lf | fps ≥ tf | fps = tf − 1 | fps = tf − 2 | fps < tf − 3 |
|---|---|---|---|---|
| $L_{fps}$ | 0 | 1 | 2 | 3 |
| explanation | target state | dropping 1 frame | dropping 2 frames | serious frame drop |

(4-E), a state parameter S=S(Lcps, Lfps) may be determined based on Lcps and Lfps.

As an example, p=0.5 and q=1 may be preset in a case that a goal is to keep performance unchanged and reduce power consumption by half.

For example, tc=250 mA, tf=24 Hz may be determined in a case of p=0.5, q=1, rc=500 mA, rf=24 Hz.

Then, Lcps=0 in a case of cps≤250 mA, Lcps=1 in a case of 250 mA<cps≤375 mA, Lcps=2 in a case of 375 mA≤cps≤500 mA, Lcps=3 in a case of 500 mA<cps≤625 mA, Lcps=4 in a case of cps>625 mA.

Then, Lfps=0 in a case of fps≥24 Hz, Lfps=1 in a case of fps=23 Hz, Lfps=2 in a case of fps=22 Hz, Lfps=3 in a case of fps<21 Hz.

For example, the state parameter S=S(2, 1) may be determined in a case of cps=400 mA and fps=23 Hz.

In operation 1003, the state parameter of the target abnormal application corresponding to each sampling may be input into the reinforcement learning model to obtain a suspension time adjustment strategy output by the reinforcement learning model, and the suspension time may be adjusted based on the suspension time adjustment strategy.

According to the embodiment of the disclosure, the suspension time adjustment strategy output by the reinforcement learning model may be a preset adjustment strategy. Here, the preset adjustment strategy (hereinafter also referred to as an action A) may include, but not limited to, extending the suspension time t by a unit time (e.g., 1 ms), reducing the suspension time by a unit time (e.g., 1 ms), and remaining unchanged, by referring to Table 5:

TABLE 5

Schematic table of value of A

| | = | − | + |
|---|---|---|---|
| action Lt<br>explanation | 0<br>t remains unchanged | 1<br>t is reduced by 1 ms | 2<br>t is extended by 1 ms |

According to an embodiment of the disclosure, various values of the state parameter may be determined based on the above Tables 3 and 4, so a one-step penalty (hereinafter also known as R) may be set for each state parameter based on a minimization penalty value function. It should be noted that, in a case that the state parameter table represents a serious frame drop, a larger one-step penalty is given, by referring to Table 6:

TABLE 6

Schematic table of value of R

| | $L_{fps}$ | | | |
|---|---|---|---|---|
| $L_{cps}$ | 0 | 1 | 2 | 3 |
| 0 | 0 | 1 | 2 | 6 |
| 1 | 1 | 2 | 3 | 7 |
| 2 | 2 | 3 | 4 | 8 |
| 3 | 3 | 4 | 5 | 9 |
| 4 | 4 | 5 | 6 | 10 |

For example, R(S(1, 1))=R(1, 1)=2 in a case of the state parameter S=S(1,1).

According to embodiment of the disclosure, a discounted action value Q of performing A based on S may be determined based on the above state parameter S, action A and one-step penalty R, and the discounted action value Q may be expressed by the following Equation 19:

$$Q(S, A) = Q(S, A) + \alpha(R + \gamma \cdot Q(S', A') - Q(S, A)) \quad \text{Equation 19}$$

Wherein, Q(S, A) represents a discounted action value of performing A based on S, Q(S', A') represents a discounted action value of performing A' based on S', S represents a state parameter determined by the last sampling, S' represents a state parameter determined by the current sampling, A represents an action performed after the last sampling, A' represents an action to be performed after the current sampling, and R represents a one-step penalty obtained by the state parameter determined by the current sampling, α and γ are default values.

The above Equation 19 may also be expressed as the following Equation 20:

Equation 20

$$Q[L_{cps}, L_{fps}, A] = Q[L_{cps}, L_{fps}, A] + \alpha(R[L'_{cps}, L'_{fps}] + \gamma \cdot Q[L'_{cps}, L'_{fps}, A'] - Q[L_{cps}, L_{fps}, A])$$

According to an embodiment of the disclosure, a null Q-value table may be preset before restriction on the target abnormal call action.

FIG. 11 is a schematic diagram of a null Q-value table shown according to an embodiment of the disclosure. During the process of restriction on the target abnormal call action, the state parameters of the target abnormal application corresponding to each sampling are input into a reinforcement learning model to obtain the discounted action value Q of performing the action based on the state parameter corresponding to the last sampling, and the same is added to the null Q-value table to complete updating of the Q-value table. It should be noted that Q-values in the Q-value table may be covered, in other words, when the discounted action value Q of performing the same action with the same state parameter appears, the previously determined Q-value may be covered by the following determined Q-value.

Figure 12:
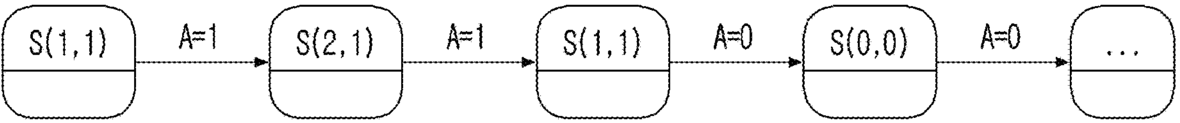
FIG. 12 is a schematic diagram of a state parameter-action change according to an embodiment of the disclosure.

FIG. 12 is a schematic diagram of a state parameter-action change according to an embodiment of the disclosure. The process of updating the Q-value table is described with a specific example in conjunction with FIGS. 11 and 12 below.

Specifically, before the restriction on the target abnormal call action, a null Q-value table as shown in FIG. 11 may be acquired, and then the restriction on the target abnormal call action may be performed, the sampling operation is performed continuously during the process of the restriction on the target abnormal call action, and the changes of the state parameter with the action is shown in FIG. 12.

For a change of the state parameter from S(1,1) to S(2,1), R[2,1]=3 may be determined by the above Table 6, and then Q[1,1,1]=0.6 may be determined by the above Equation 20, so an item of Lcps=1, Lfps=1, A=1 in the Q-value table may be updated as 0.6.

For a change of the state parameter from S(2,1) to S(1,1), R[1,1]=2 may be determined by the above Table 6, and then Q[2,1,1]=0.508 may be determined by the above Equation 20, so an item of Lcps=2, Lfps=1, A=1 in the Q-value table may be updated as 0.508.

For a change of the state parameter from S(1,1) to S(0,0), R[0,0]=0 may be determined by the above Table 6, and then Q[1,1,0]=0 may be determined by the above Equation 20, so an item of Lcps=1, Lfps=1, A=0 in the Q-value table may be updated as 0.

Based on the above three changes, three items are updated in the Q-value table, namely, the item of Lcps=1, Lfps=1, A=1 is 0.6, the item of Lcps=2, Lfps=1, A=1 is 0.508, the item of Lcps=1, Lfps=1, A=0 is 0, respectively.

It should be noted that in this embodiment of the disclosure, the learning rates $\alpha$=0.2, $\gamma$=0.9.

According to the embodiment of the disclosure, the state parameters of the target abnormal application corresponding to each sampling are input into the reinforcement learning model, when the Q-values of the same state parameter are not recorded in the Q-value table, any action may be output based on the above Table 5; when the Q-values of the same state parameter are recorded in the Q-value table (that is, the Q-value obtained by performing one of the three actions as in the Table 5 with the same state parameter is at least recorded in the Q-value table), a F-greedy strategy function may be adopted to determine the output of the reinforcement learning model, specifically:

First, a random number x of a section of (0, 1) may be generated by using a random function.

Then, a size relationship of x and a preset threshold F may be determined.

Finally, an action corresponding action of the smallest one among Q-values of the same status parameter may be selected as the suspension time adjustment strategy in a case of x>ε, and any action may be selected as the suspension time adjustment strategy based on the above Table 5 above in a case of x≤ε.

Referring to the above embodiment of the disclosure, after performing this suspension time adjustment strategy, the Q-value table may be updated based on the state parameter and the value of R determined by a next sampling.

Based on this, with the continuous restriction on the target abnormal call action, the optimum action may be determined through the above processes, so as to obtain the most appropriate power consumption and performance benefit ratio.

As an example, the state parameter determined by the current sampling is S(2,1). At this time, the Q-values of the same state parameter are recorded in the Q-value table: Q[2,1,0]=0.7, Q[2,1,1]=0.5, Q[2,1,2]=0.9, the preset threshold value ε=0.1, then the random number x of the section of (0,1) may be generated by using the random function. The output suspension time adjustment strategy is A=1 in a case of x>0.1, and the output suspension time adjustment strategy is any one of A=0, 1, 2 in a case of x≤0.1.

As an example, a case of x>ε may be regarded as a preferable case, in other words, when the Q-values of the same state parameter are recorded in the Q-value table, the action corresponding to the smallest one of the Q-values of the same state parameter is directly selected as the suspension time adjustment strategy.

In the above embodiments of the disclosure, it has been described that an application M with the function of playing videos calls the system service interface "ConnectivityManager.getActiveNetworkInfo" at a frequency of more than 1000 times per second, which results in very high current consumption and brings a large system load, another application N with the function of playing videos calls the system service interface "AudioManager. adjustStreamVolume" at a frequency of more than 200 times per second, which results in high current consumption, brings a larger system load, and generates a problem of restart. The execution of M and N is as the application running method in the embodiment of the disclosure, and the corresponding Binder is restricted, and the comparison results before and after the execution may be obtained as shown in Table 7:

TABLE 7

Schematic table of comparison results before and after the execution

| | current consumption | | | Cpu load | | | system restarting | | | Fps | |
|---|---|---|---|---|---|---|---|---|---|---|---|
| APP | before | after | improvement | before | after | improvement | before | after | improvement | before | after |
| M | 689 mA | 329 mA | 52% ↓ | 108% | 23% | 78% ↓ | | | | 60 | 60 |
| N | 620 mA | 270 mA | 56% ↓ | 190% | 70% | 63% ↓ | yes | no | no restart | 60 | 60 |

It may be seen from the table above that, after the execution, the high current consumption and high system load of M and N are greatly improved, but the performance is not reduced, and a situation of system restart may be avoided, and M and N recover from the existence of abnormality to a normal state.

Returning to FIG. 3, according to an embodiment of the disclosure, after determining the target abnormal application based on the feature data of all the running applications in operation 302, a first notification information may be displayed, wherein the first notification information indicates the existence of the target abnormal application and prompts a user an optimization function for the target abnormal application is able to be opened; a first operation is executed in response to receiving an opening instruction for the optimization function; wherein the first operation includes: the operation of acquiring the interactive data of all the call actions of the target abnormal application within the preset duration in operation 303, the operation of determining the target abnormal call action based on the interactive data of all the call actions in operation 304; the operation of performing the call restriction on the target abnormal call action in response to monitoring the target abnormal call action in operation 305.

Figure 13:
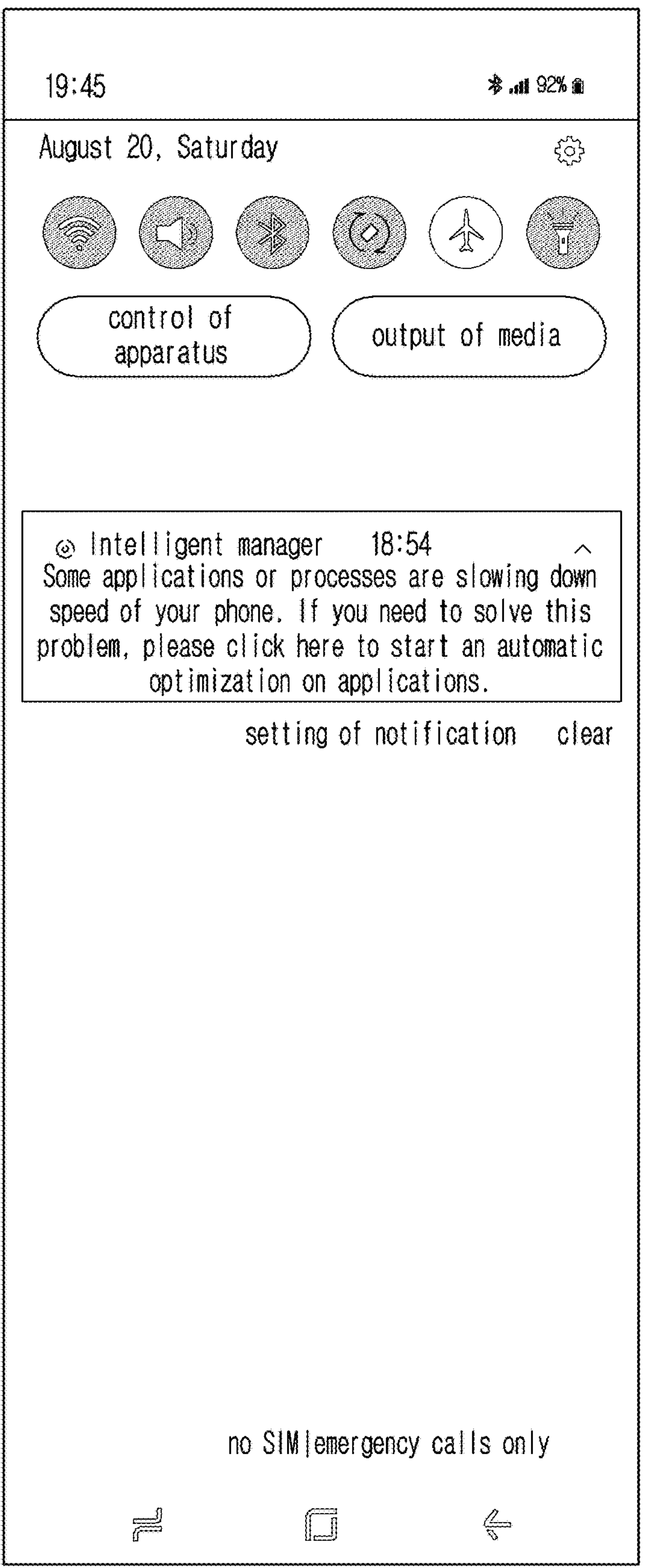
FIG. 13 is a schematic diagram of a first user interface displayed when a target abnormal application is detected according to an embodiment of the disclosure.

FIG. 13 is a schematic diagram of a first user interface displayed when a target abnormal application is detected according to an embodiment of the disclosure.

Referring to FIG. 13, in the case that a target abnormal application (e.g., an application that calls system services with a high frequency) which is abnormal through a shallow detection, a deep detection may not be directly performed, but the first notification information may be displayed to the user firstly, for example, but not limited to, "Some applications or processes are slowing down speed of your phone. If you need address this issue, please click here to start an automatic optimization on applications." After the user selects to open the automatic optimization on applications responding to the first notification information, the deep detection may be performed to find the target abnormal call action, so as to achieve a purpose of automatic optimization on the applications by performing call restriction on calls of the target abnormal call action.

Returning to FIG. 3, according to an embodiment of the disclosure, during the process of the first operation (i.e., operations 303, 304, and 305), second notification information may be displayed, wherein the second notification information prompts the user the optimization function for the target abnormal application is able to be closed; the first operation is stopped being executed in response to receiving a closing instruction for the optimization function. For example, during the process of the first operation, once the close instruction for the optimization function is received, the execution may be stopped, regardless of what degree or step is executed.

Figure 14:
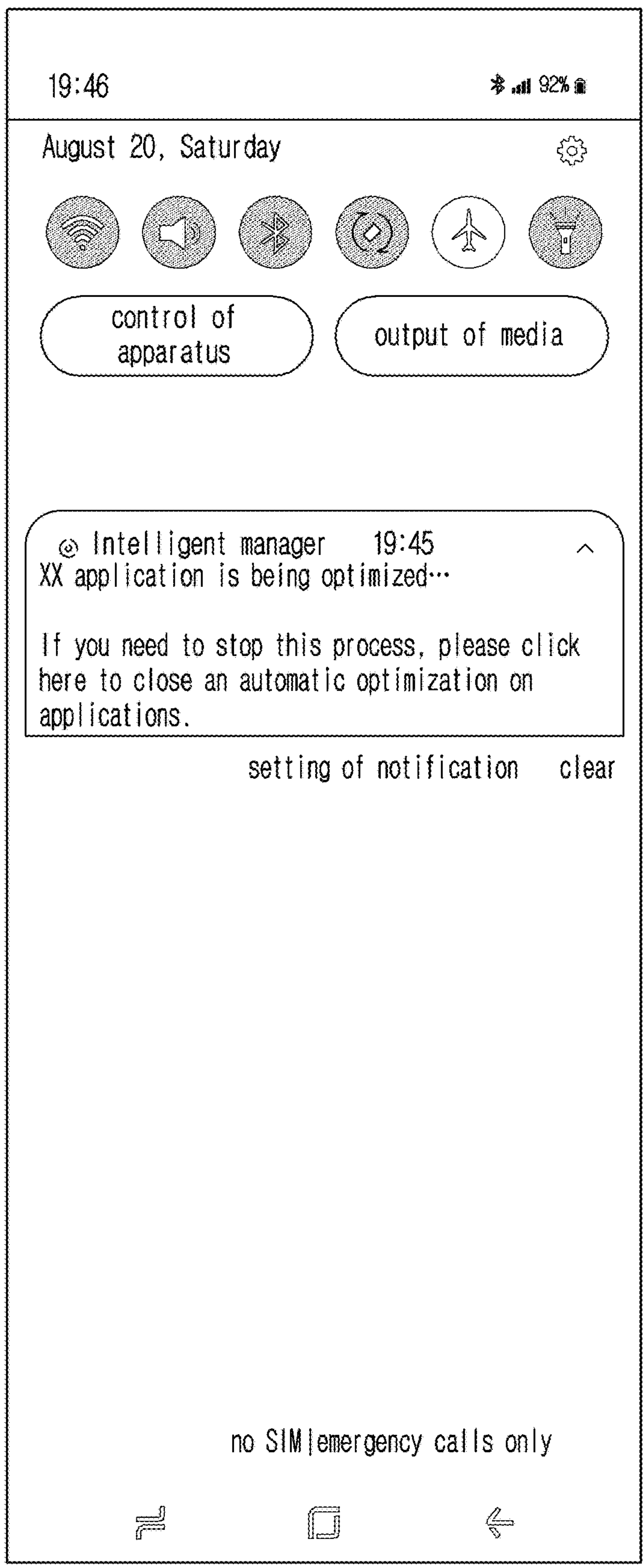
FIG. 14 is a schematic diagram of a second user interface displayed during the process of optimization of a target abnormal application according to an embodiment of the disclosure.

FIG. 14 is a schematic diagram of a second user interface displayed during an optimization of a target abnormal application according to an embodiment of the disclosure.

Referring to FIG. 14, after a user selects to open an automatic optimization on applications, for example, after the user selects to open the automatic optimization on applications on the first user interface shown in FIG. 13, a deep detection may be performed to find a target abnormal call action, so as to perform call restriction on the target abnormal call action. During this, the second notification message may be displayed to the user, which prompts the user which application is being optimized, and prompts the user to close the optimization function. For example, but not limited to, "XX application is being optimized. If you need stop this process, please click here to close an automatic optimization application.". If there are a plurality of applications which need to be optimized, prompt information about which application is being optimized may be displayed in real time when the application is being optimized. For example, the second notification information may prompt the user that a first application is being optimized when the first application is being optimized, and the second notification information may be updated to prompt the user that a second application is being optimized when the optimization of the first application is finished and the second application is being optimized, and so on. After the user selects to close the automatic optimization function responding to the second notification information, the automatic optimization on applications is stopped.

Figure 15:
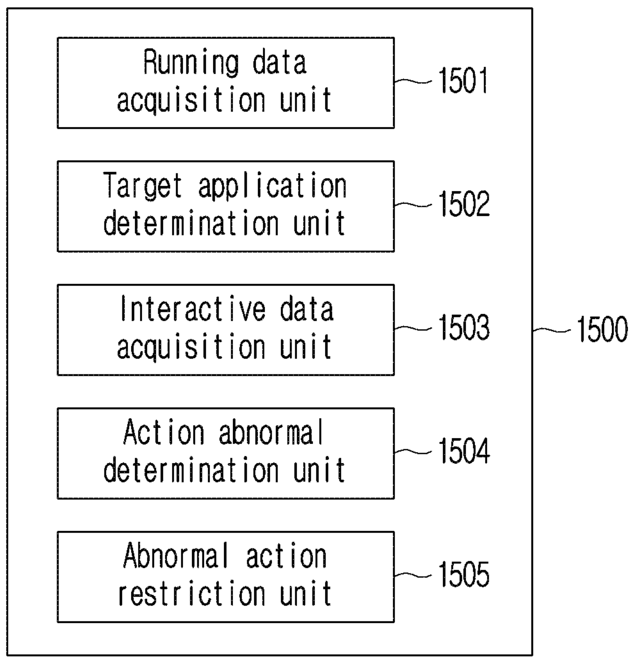
FIG. 15 is a block diagram of an application running device according to an embodiment of the disclosure.

FIG. 15 is a block diagram of an application running apparatus according to an embodiment of the disclosure.

Referring to FIG. 15, an application running apparatus 1500 includes a running data acquisition unit 1501, a target application determination unit 1502, an interactive data acquisition unit 1503, an action abnormal determination unit 1504, and an abnormal action restriction unit 1505.

The running data acquisition unit 1501 may acquire feature data of all running applications. Here, the feature data may include current system state data and running state data of an application.

According to an embodiment of the disclosure, the electronic terminal may be, but is not limited to, a device that may install various applications, such as a mobile phone, a tablet computer, or the like, the operating system on the electronic terminal may be, but is not limited to, Android; the running applications may be, but are not limited to, third-party application ($3^{rd}$ APP).

According to an embodiment of the disclosure, the system state data may include, but not limited to, at least one of: a CPU occupancy rate of system service processes (system CPU usage), the lowest current consumption value of apparatus (bottom current), an average current consumption value of apparatus (average current), an average CPU occupancy rate of apparatus (average total CPU usage), whether there is a touch event in the last 5 seconds (during touch), an average CPU frequency of apparatus (average CPU frequency), the lowest CPU frequency of apparatus (bottom CPU frequency). The running state data of the application may include, but is not limited to, a CPU occupancy rate of application (APP CPU Usage). It should be noted that the plurality of parameters above are statistical values of parameters over a period of time. For example, the average current consumption value of apparatus is an average current consumption value of the apparatus over a period of time.

The target application determination unit 1502 may determine a target abnormal application(s) based on the feature data of all the running applications. Here, the abnormal applications may refer to applications that call system services with a high frequency. The target application determination unit 1502 may determine one or more target abnormal applications based on the feature data of all the running applications. The application running method of the disclosure is described below by taking one target abnormal application as an example.

According to an embodiment of the disclosure, first, the target application determination unit 1502 may determine a target application(s) from among all the running applications based on the running state data of all the running applications. For example, the running state data may include, but not limited to, a CPU occupancy rate of the running applications. Based on this, the target application determination unit 1502 may determine the top N applications of highest CPU occupancy rate from among all the running applications, wherein the N is a preset positive integer, for example, but not limited to, the target application determination unit 1502 may rank all the running applications in an descending order of corresponding CPU occupancy rates, and select the top N applications in order, wherein a value of N may be taken as 3.

Then, the target application determination unit 1502 may determine the target abnormal application(s) from among the target application(s) based on feature data of the target application(s). Here, the target application determination unit 1502 may determine whether the running state data of a target application and the current system state data are abnormal, and if so, determine that this target application is an abnormal application. For example, the target application determination unit 1502 may obtain corresponding decision results to each target application through a decision tree model based on the feature data of each target application, and determine the target abnormal application(s) from the target application(s) based on the decision results. Specifically, for each of at least one target application(s), the target application determination unit 1502 may input the running state data of each target application and the current system state data into the decision tree model to obtain decision results on whether each target application is abnormal, and determine whether each target application is a target abnormal application based on the decision results. According to the embodiment of the disclosure, performing a shallow detection based on the decision tree model may make a screening on whether the target application is abnormal, inputs of the decision tree model are the running state data of the target applications and the current system state data which may be directly read, which will not cause additional load and will not interfere with the running of the target applications, which may avoid system resource consumption and load caused by performing a deep detection directly.

As an example, the target application determination unit 1502 may perform determination for multiple times by the decision tree model, and determine whether each target application is a target abnormal application based on the multiple times of decision results. For example, the running state data of the target application and the system state data may be acquired at a certain time interval (for example, 10 s) and input into the decision tree model, and then it is determined that a corresponding target application is a target abnormal application if three times of consecutive decision results are abnormal.

According to an embodiment of the disclosure, the decision tree model for determining the target abnormal application(s) which is abnormal from among the target application(s) may be pre-trained. Based on this, the application running apparatus 1500 may also include a decision tree model training unit (not shown), which may perform the following operations:

First, the decision tree model training unit may obtain a first training sample set, wherein each training sample in the first training sample set includes a plurality of feature data of an application and a label indicating whether there is an abnormality, wherein the plurality of feature data includes system state data and running state data when this application is running.

Here, the plurality of feature data may be described in the above embodiments: the CPU occupancy rate of system service processes, the CPU occupancy rate of application, the lowest current consumption value of apparatus, the average current consumption value of apparatus, the average CPU occupancy rate of apparatus, whether there is a touch event in the last 5 seconds, the average CPU frequency of apparatus, and the lowest CPU frequency of apparatus. For example, in one embodiment of the disclosure, the first training sample set may be represented as the above Table 1.

Then, the decision tree model training unit may build a decision tree model based on the first training sample set and with the plurality of feature data as nodes. Here, the decision tree model may be a C4.5 decision tree model. The decision tree model training unit may build the decision tree model layer by layer based on the entropy gain rate, according to the first training sample set.

The execution operation of the decision tree model training unit is set forth through a specific embodiment of the disclosure, wherein the decision tree model training unit is configured to execute:

It should be noted that in this embodiment of the disclosure, the first training sample set contains 500 training samples, wherein there are 100 training samples of which the label is abnormal (i.e., negative examples), and there are 400 training samples of which the label is not abnormal, or normal (i.e., positive examples).

First, the decision tree model training unit may grade each feature data according to a size of value. Specifically, the CPU occupancy rate of system service processes may be divided into three grades of <56%, 56-72% and >72%, the CPU occupancy rate of application may be divided into three grades of <56%, 56-72% and >72%, the lowest current consumption of apparatus may be divided into three grades of <400 mA, 400-500 mA and >500 mA, and the average current consumption of apparatus may be divided into three grades of <500 mA, 500-600 mA and >600 mA, the average CPU occupancy rate of apparatus may be divided into three grades of <100%, 100-150% and >150%, whether there is a touch event in the last 5 seconds may be divided into two grades of Yes and No, the average CPU frequency of apparatus (percentage) may be divided into three grades of <70%, 70-80% and >80%, the lowest CPU frequency of apparatus (percentage) may be divided into three grades of <60%, 60-70% and >70%.

Second, the decision tree model training unit may calculate an entropy value Ent(S) of a root node through the above Equation 1.

Third, the decision tree model training unit may calculate entropy gains of each feature data, wherein the entropy gains of each feature data may be determined by calculating the entropy values of each level of the corresponding feature data.

For example, an entropy gain of the CPU occupancy rate of system service processes may be determined by calculating the entropy values of the three grades of <56%, 56~72% and >72%. Then, First, it is need to determine the number of positive examples and the number of negative examples contained in the three grades, that is, determine that there are 250 training samples of the CPU occupancy rate of system service processes of <56% (10 positive examples, 240 negative examples), and there are 130 training samples of the CPU occupancy rate of system service processes between 56~72% (30 positive examples, 100 negative examples), there are 120 training samples of the CPU occupancy rate of system service processes of >72% (60 positive examples and 60 negative examples); then determine, by the above Equations 2 to 4, the entropy value Ent(D11) of the CPU occupancy rate of system service processes of <56%, the entropy value Ent(D12) of the CPU occupancy rate of system service processes between 56%-72%, and the entropy value Ent(D13) of the CPU occupancy rate of system service processes >72%, and finally calculate the entropy gain Gain(D1) of the CPU occupancy rate of system service processes by the above Equation 5.

The decision tree model training unit may use the same calculation processes as those of the entropy gain of the CPU occupancy rate of system service processes to determine an entropy gain of the CPU occupancy rate of application g2, an entropy gain of the lowest current consumption value of apparatus g3, an entropy gain of the average current consumption value of apparatus g4, an entropy gain of the average CPU occupancy rate of apparatus g5, an entropy gain of whether there is a touch event in the last 5 seconds g6, an entropy gain of the average CPU frequency of apparatus g7, an entropy gain of the lowest CPU frequency of apparatus g8.

Fourth, the decision tree model training unit may calculate an average entropy gain of each feature data by the above Equation 6.

Fifth, the decision tree model training unit may determine an entropy gain of the feature data that is greater than the average entropy gain among the entropy gains of the above feature data. In this embodiment of the disclosure, the entropy gain of the feature data that is greater than the average entropy gain is the entropy gain of the CPU occupancy rate of system service processes g1 and the entropy gain of the lowest current consumption value of apparatus g3.

Sixth, the decision tree model training unit may calculate an entropy gain rate r1 of the CPU occupancy rate of system service processes by the above Equations 7 and 8.

The decision tree model training unit may use the same calculation process as that of the entropy gain rate of the CPU occupancy rate of system service processes, to determine an entropy gain rate r2 of the lowest current consumption value of application.

Seventh, the decision tree model training unit may determine the size relationship between R1 and R2, and take the feature data corresponding to the larger one as a node of a first layer of the decision tree model (it should be noted that in the case of r1=r2, any either of them may be taken as the node of the first layer). In this embodiment of the disclosure, r1>r2, so the CPU occupancy rate of system service processes may be taken as the node of the first layer of the decision tree model. The node of the first layer in this embodiment may refer to FIG. 4.

Eighth, the decision tree model training unit may determine a node of a second layer of the decision tree model. Specifically, referring to FIG. 4, there are 250 training samples of the CPU occupancy rate of system service processes of <56%, wherein 10 training samples are positive examples and 240 training samples are negative examples. The process of determining the node of the second layer may be described by taking this branch as an example below.

Ninth, the decision tree model training unit may determine an entropy value Ent(S) of a root node of this branch of the CPU occupancy rate of system service processes of <56% by the above Equation 9.

Tenth, the decision tree model training unit may calculate entropy gain of each feature data of this branch other than the CPU occupancy rate of system service processes in the same manner as the above manners for determining the entropy gain: determining an entropy gain of the CPU occupancy rate of application g21, an entropy gain of the lowest current consumption value of apparatus g22, an entropy gain of the average current consumption value of apparatus g23, an entropy gain of the average CPU occupancy rate of apparatus g24, an entropy gain of whether there is a touch event in the last 5 seconds g25, an entropy gain of the average CPU frequency of apparatus g26, and an entropy gain of the lowest CPU frequency of apparatus g27.

Eleventh, the decision tree model training unit may calculate an average entropy gain of each feature data of this branch by the above Equation 10.

Twelfth, the decision tree model training unit may determine an entropy gain of feature data that is greater than the average entropy gain among the entropy gain of each feature data of this branch. In this embodiment of the disclosure, the entropy gain of the feature data that is greater than the average entropy gain is the entropy gain of the CPU occupancy rate of application g21, the entropy gain of the lowest current consumption value of apparatus g22, and the entropy gain of the lowest CPU frequency of apparatus g27.

Thirteenth, the decision tree model training unit may use the same manner as the above manner of determining the entropy gain rate, to calculate an entropy gain rate of the CPU occupancy rate of application, an entropy gain rate of the lowest current consumption value of application, and an entropy gain rate of the lowest CPU frequency of application, respectively, and take feature data corresponding to the larger one as a root node of this branch, that is, the node of the second layer of the decision tree model. In this embodiment of the disclosure, the lowest current consumption value of apparatus is determined as the root node of this branch. The node of the second layer in this embodiment may refer to FIG. 5.

Fourteenth, the decision tree model training unit may complete building of the decision tree model by referring to the above processes of building the nodes of the first and second layer of the decision tree model. The decision tree model in this embodiment may refer to FIG. 6.

According to an embodiment of the disclosure, the above trained decision tree model may be continuously updated by self-learning during the process of using an electronic terminal. Based on this, the application running apparatus 1500 may also include a decision tree model updating unit (not shown), which may acquire a label indicating whether a decision result corresponding to a target application obtained through the decision tree model is correct, and update the decision tree model based on this label and the feature data of the target abnormal application. Specifically, the decision tree model updating unit may acquire a plurality of updating samples, and then update the decision tree model based on the plurality of updating samples, wherein each updating sample may include a plurality of feature data of one application and a label indicating whether the decision result of the decision tree model is correct for the application.

As an example, the application running apparatus 1500 may further include an updating sample acquisition unit (not shown), which may acquire an updating sample related to a target application, wherein the updating sample related to the target application includes a plurality of feature data of the target application and a label indicating whether the decision result of the decision tree model is correct, wherein, whether the decision result of the decision tree model is correct may be determined by a prediction result obtained after executing an action abnormal prediction unit 1505 as shown in FIG. 15. For example, the label indicates that the decision result of the decision tree model is correct in a case that the action abnormal prediction unit 1505 predicts that the target call action is abnormal, and the label indicates that the decision result of the decision tree model is wrong in a case that the action abnormal prediction unit 1505 predicts that the target call action is not abnormal.

On this basis, the decision tree model updating unit may update the decision tree model based on the plurality of updating samples, after obtaining the plurality of updating samples from each unit of the application running apparatus 1500. Here, the manner of updating the decision tree model may include, but not limited to, post-pruning the decision tree model. According to the embodiment of the disclosure, updating the decision tree model based on the updating samples may improve a decision accuracy of the decision tree model.

As an example, the decision tree model may be updated for many times with the use of the electronic apparatus, for example, but not limited to, updating at preset time intervals, and updating every time a preset number of updating samples are acquired.

The execution process of the decision tree model updating unit may be set forth through a specific embodiment below, wherein the decision tree model updating unit is configured to:

First, the decision tree model update unit may acquire 100 updating samples (wherein, there are 80 updating samples of which a label indicates a decision result to be correct, 20 updating samples of which a label indicates a decision result to be wrong, and a decision accuracy of 100 updating samples is 80%). Wherein, partial updating samples may be represented as the above Table 2.

Second, referring to FIG. 6, the decision tree model update unit may determine the updating samples under the node branch of the average CPU frequency of application. In this embodiment of the disclosure, there are 20 updating samples under this branch, and there are 6 updating samples of which the decision result is not abnormal (wherein, there is one updating sample of which the label indicates that the decision result of the decision tree model is correct, and there are 5 updating samples of which the label indicates that the decision result of the decision tree model is wrong), there are 14 updating samples of which the decision result is abnormal (wherein, there are 13 updating samples of which the label indicates the decision result of the decision tree model is correct, and there is one updating sample of which the label indicates that the decision result of the decision tree model is wrong).

Third, the decision tree model updating unit may determine a decision accuracy under this branch through the above Equation 11. If the node of the average CPU frequency of application is replaced by: existence of abnormality, the decision accuracy after replacement may be determined by the above Equation 12. Based on the above Equations 11 and 12, it may be seen that the decision accuracy is improved, then the node of the average CPU frequency of application may be pruned, replaced by existence of abnormality, and its branches may be deleted.

Fourth, referring to FIG. 6, the decision tree model updating unit may determine the decision accuracy, after replacing the node of the lowest CPU frequency of application by existence or inexistence of abnormality, and compare this decision accuracy with 84%, the node of the lowest CPU frequency of application is not pruned if the decision accuracy remains unchanged or decreases, it is pruned if the decision accuracy increases.

Fifthly, the decision tree model updating unit may continuously prune based on the above pruning strategy until pruning of all nodes at the last layer are completed (that is, pruning cannot be performed any more), to update the decision tree model.

Returning to FIG. 15, the interactive data acquisition unit 1503 may acquire interactive data of all call actions of the target abnormal application within a preset duration. Wherein, the call action refers calling any one function in a system service or other applications by any one thread in the target abnormal application. For example, the call action may include a first type of call action and a second type of call action, wherein the first type of call action is calling any one function in a system service by any one thread in the target abnormal application, and the second type of call action is calling any one function in other applications by any one thread in the target abnormal application.

According to an embodiment of the disclosure, the call action may be, but is not limited to, a Binder. Then, the interactive data acquisition unit 1503 may monitor the target abnormal application and turn on Systrace actions within a certain range of time (such as 10 s), to capture its Binder data.

As an example, the interactive data acquisition unit 1503 may use two keywords of binder_driver and binder_lock to capture the Binder data. For example, in one embodiment of the disclosure, the partial captured Binder data may be represented as the following code:

```
VolumeDialogCon-3039 (2384)[002]....275825.902019:
binder_transaction: transaction=157059329 dest_node=13415
dest_proc=1136 dest_thread=0 reply=0 flags=0x12 code=0x83
  Binder:1136_8-2407 (1136)[002]....275825.903039:
binder_transaction: transaction=157059340 dest_node=0 dest_proc=2384
dest_thread=3039 reply=1 flags=0x0 code=0x0
```

Wherein, VolumeDialogCon-3039 represents a process ID of the target abnormal application, 2384 represents a thread ID in the target abnormal application corresponding to this Binder, reply=0 represents a sender, code=0x83 represents a function in the system service corresponding to this Binder, dest_proc=1136 indicates the system service.

Wherein, Binder:1136_8-2407 indicates a process ID of the system service corresponding to this Binder, and reply=1 indicates a receiver.

The action abnormal determination unit 1504 may determine a target abnormal call action(s) based on the interactive data of all the call actions. The action abnormal determination unit 1504 may determine one or more target abnormal call actions based on the interactive data of all the call actions. The application running method of the disclosure is described below by taking one target abnormal call action as an example.

According to an embodiment of the disclosure, the interactive data may include a number (of times) of calls of a call action within a preset duration. First, the action abnormal determination unit 1504 may screen the first type of call action from among all the call actions; then determine the first type of call action with the most number of calls as the target call action; finally, determine the target abnormal call action based on the number of calls of the target call action within the preset duration.

As an example, in a case that the process ID of the target abnormal application is VolumeDialogCon-3039, first, the action abnormal determination unit 1504 may determine Binders of which the process IDs are VolumeDialogCon-3039, reply=0, dest_proc=1136 from among all the call actions, as the first type of call action, and count a number of calls of each first type of call action within the preset duration (such as 2 s) at the same time; then, determine a first type of call action with the most number of calls among all the first type of call actions as the target call action. Referring to FIG. 7, the first type of call action with the most number of calls is a (550 times). According to the number of calls of the call action a within the preset duration, whether call action a is the target abnormal call action is determined.

According to an embodiment of the disclosure, the action abnormal determination unit 1504 may predict whether the target call action is abnormal through a Gaussian mixture clustering model. The action abnormal determination unit 1504 may obtain an abnormal probability of the target call action through the Gaussian mixture clustering model based on the number of calls of the target call action within the preset duration, and determine the target call action as the target abnormal call action in response to the abnormal probability being higher than a preset threshold. Specifically, first, the action abnormal determination unit 1504 may acquire the number of calls of the target call action within the preset duration; then, the action abnormal determination unit 1504 may input the number of calls of the target call action within the preset duration into the Gaussian mixture clustering model to obtain a probability, predicted by the Gaussian mixture clustering model, that the target call action is abnormal; finally, the action abnormal determination unit 1504 may determine the target call action of which the abnormal probability is higher than the preset threshold as the target abnormal call action. For example, but not limited to, if the preset threshold is 70%, the target call action of which the abnormal probability is higher than 70% is determined as the target abnormal call action, and the target call action of which the abnormal probability is not higher than 70% is determined as inexistence of abnormality, that is, as a normal call action. If it is determined that the target call action is not abnormal, there is no need to perform call restriction on this target call action subsequently.

According to an embodiment of the disclosure, the Gaussian mixture clustering model for predicting the abnormal probability of the target call actions may be pre-trained. Based on this, the application running apparatus 1500 may also include a Gaussian mixture clustering model training unit (not shown), which may perform operations of:

First, the Gaussian mixture clustering model training unit may acquire a second training sample set, wherein each training sample in the second training sample set includes a number of times (that) the first type of call action with the most number of times is called by one application within a preset duration, wherein the first type of call action is calling any one function in the corresponding system service by any one thread in the application.

Then, based on the second training sample set, the Gaussian mixture clustering model training unit may train the Gaussian mixture clustering model with a probability as an output, which is a probability that the number of calls of the first type of call action within the preset duration is in each of a plurality of preset clusters (Gaussian cluster), wherein the plurality of preset clusters at least include: existence of abnormality and inexistence of abnormality.

The Gaussian mixture clustering model training unit may use a maximum expectation algorithm (EM) to divide the second training sample set into the plurality of preset clusters, and then calculate means and variances of each cluster, so as to obtain probability density functions of each cluster, and complete the training of the Gaussian mixture clustering model.

The execution operation of the Gaussian mixture clustering model training unit may be set forth through a specific embodiment below, wherein the Gaussian mixture clustering model training unit is configured to:

First, the Gaussian mixture clustering model training unit may obtain the second training sample set, wherein, each training sample in the second training sample set includes the number of times (that) the first type of call action with the most number of times is called by one application within the preset duration, wherein the first type of call action is calling any one function in the corresponding system service by any one thread in the application.

Second, referring to FIG. 8, the scatter points are clustered into two clusters, scatter points on the upper side may be divided as existence of abnormality, and scatter points on the lower side may be divided as inexistence of abnormality, and the scatter points on the lower side may be further divided into three parts, namely, triangular scatter points, rectangular scatter points and rhombic scatter points, respectively. In the above embodiments of the disclosure, it is known that the abnormality may be a high-frequency calling system service, so the Gaussian mixture clustering model training unit may divide the scatter points on the upper side (that is, the part of existence of abnormality) as abuse (cluster), divide the triangle scatter points as high-use (cluster), divide the rectangular scatter points as medium-use (cluster), and divide rhombic scatter points as low-use (cluster). It should be noted here that, it is only illustrative to divide into the four clusters as shown in this step and name them as abuse, high-use, medium-use and low-use, respectively. The disclosure is not limited to this, but also protects other division manners, for example, of division into two clusters of existence of abnormality and inexistence of abnormality as in the above embodiment.

Third, the Gaussian mixture clustering model training unit may determine initial prior probabilities, initial means, initial standard deviations of each of the four clusters, and determine an initial variance matrix. In this embodiment of the disclosure, the initial prior probabilities of low-use (cluster), medium-use (cluster), high-use (cluster) and abuse (cluster) are p1=0.4, p2=0.3, p3=0.2 and p4=0.1, respectively, the initial mean values are u1=40, u2=80, u3=120 and u4=500 respectively, the initial standard deviations are e1=15, e2=20, e3=25 and e4=200 respectively, and the initial variance matrix is mat0=[p1, p2, p3, p4, u1, u2, u3, u4, e1, e2, e3, e4].

Fourth, the Gaussian mixture clustering model training unit may carry out at least one round of iteration for all training samples in the second training sample set through the above Equations 13 to 16, based on the above initial prior probabilities, initial means and initial standard deviations:

It should be noted that in each round of iteration, first, probabilities of each training sample in each of the four clusters are calculated using prior probabilities, means and standard deviations (a sum of the four probabilities is 1), and then posterior probabilities, means and standard deviations are obtained; then a deviation between a prior variance matrix and a posterior variance matrix is compared, the iteration may be stopped in a case that the deviation is less than 0.001, otherwise, the prior probabilities, means and standard deviations may be updated and a next round of iteration is carried out, until the preset number of iterations is completed.

Fifth, the Gaussian mixture clustering model training unit may obtain the final means and final standard deviations of each of the four clusters after the iteration. In this embodiment of the disclosure, the final means of low-use (cluster), medium-use (cluster), high-use (cluster) and abuse (cluster) are u1=50, u2=100, u3=150 and u4=700, respectively, and the final standard deviations are e1=20, e2=25, e3=30 and e4=300, respectively. For example, the Gaussian probability density functions of each cluster may refer to FIG. 9.

Based on this, a probability of the number of calls in each cluster may be calculated by the above Equation 17.

For example, if the first type of call action a with the most the most number of calls (550 times) is determined in the above embodiment of the disclosure, then the probability that a (550 times) is in the abusing (cluster) may be determined by the above Equation 18, moreover, in the above embodiment of the disclosure, it is determined that the preset threshold is 0.7, since 0.88 is greater than 0.7, it is determined that the target call action is abnormal.

Returning to FIG. 15, the abnormal action restriction unit 1505 may perform call restriction on the target abnormal call action in response to monitoring the target abnormal call action.

According to an embodiment of the disclosure, the abnormal action restriction unit 1505 may suspend the execution of the target abnormal call action in response to monitoring the target abnormal call action, and may release the suspension of the target abnormal call action after preset suspension time has elapsed. For example, in a case that the abnormal action restriction unit 1505 monitors the occurrence of the target abnormal call action, it may suspend the execution of the target call actions before the system service responds to the target call actions; after the preset suspension time has elapsed, may release the suspension of the target abnormal call action. According to an embodiment of the disclosure, performing the restriction on the target abnormal call action based on the suspension time may significantly reduce the system load and power consumption.

According to an embodiment of the disclosure, the application running apparatus 1500 may also include an action addition drive unit (not shown), which may add the target abnormal call actions and the preset suspension time to a call action driver to execute, by the call action driver, at least one of: monitoring the occurrence of the target abnormal call action, suspending the execution of the target abnormal call action, and releasing the suspension of the target abnormal call action.

According to an embodiment of the disclosure, the call action may be, but is not limited to, a Binder. Then, the action addition drive unit may add a target abnormal Binder (including a process ID of the target abnormal application, a thread ID in the target abnormal application corresponding to the target abnormal Binder, and a function in the system service corresponding to the target abnormal Binder) and the preset suspension time, such as 5 ms (binder sleep time=5 ms) to a Binder Driver in a kernel of the operating system, for example, but not limited to, to a node of binder enable=true in the Binder Driver. Based on this, when the Binder driver monitors the occurrence of the target abnormal Binder (that is, the process ID, the thread ID and the function are the same as data added to the node), it will trigger the restriction operation on the target abnormal Binder, that is, suspending the execution of the target abnormal Binder, and releasing the suspension of the target abnormal Binder after 5 ms has elapsed.

According to an embodiment of the disclosure, when the preset suspension time is too long, it may cause a frame drop during the running process of the target abnormal application, however the types of applications are various, that is, there may be many situations about types of the determined target abnormal applications, performing a fixed suspension time may bring different power consumption changes and the number of frames changes for different applications. If the number of frames decreases too much, it will directly affect user experience. Based on this, the application running apparatus 1500 may also include a suspension time adjustment unit (not shown). The suspension time adjustment unit may, during the process of restriction on the target abnormal call action, adjust the preset suspension time for many times through a reinforcement learning model, based on power consumption data and performance data of the target abnormal application, to achieve an optimum suspension time. For example, the suspension time adjustment unit may acquire the power consumption data and the performance data of the target abnormal application, wherein the power consumption data and performance data are pre-sampled before the call restriction on the target abnormal call action and sampled during the call restriction on the target abnormal call action, a state parameter of the target abnormal application is determined based on the power consumption data and performance data of the target abnormal application, the state parameter of the target abnormal application is input into the reinforcement learning model to obtain a suspension time adjustment strategy output by the reinforcement learning model, and the suspension time is adjusted based on the suspension time adjustment strategy. In the above process, the suspension time adjustment unit uses the reinforcement learning model to adjust the suspension time for many times, and after each adjustment of the suspension time, causes the abnormal action restriction unit 1505 to restrict the target abnormal call action based on the adjusted suspension time at this time until the next adjustment of the suspension time, so as to balance the power consumption and performance (the number of frames). Here, the reinforcement learning model may be a Sarsa Learning model.

According to an embodiment of the disclosure, first, the suspension time adjustment unit may sample the power consumption data and the performance data of the target abnormal application at a preset time interval during the process of restriction on the target abnormal call action. Here, the power consumption data obtained by sampling may be, but not limited to, an average current consumption value of application (hereinafter also referred to as cps), the performance data obtained by sampling may be, but not limited to, an average frame rate of the target abnormal application (hereinafter also referred to as fps), and the preset time interval may be, but not limited to, 5 s.

Then, the suspension time adjustment unit may determine state parameters of the target abnormal application corresponding to each sampling based on the power consumption data and the performance data obtained by each sampling, and the power consumption data and the performance data of the target abnormal application pre-sampled before the restriction on the target abnormal call action.

The process of determining the state parameter through a specific embodiment is set forth below:

First, the suspension time adjustment unit may acquire an average current consumption value of apparatus rc and an average frame rate of the target abnormal application rf pre-sampled before the restriction on the target abnormal call action.

Second, the suspension time adjustment unit may determine an average current target value $tc=p*rc$ based on rc, and determine an average frame rate target value $tf=q*rf$ based on rf, wherein p and q are preset proportion coefficients.

Third, the suspension time adjustment unit may determine a power consumption factor level $Lcps=LC(cps, tc)$ based on rc, tc and cps, by referring to the above Table 3.

Fourth, the suspension time adjustment unit may determine a performance factor level $Lfps=LF(fps, tf)$ based on tf and fps, by referring to the above Table 4.

Fifth, the suspension time adjustment unit may determine a state parameter $S=S(Lcps, Lfps)$ based on Lcps and Lfps.

As an example, $p=0.5$ and $q=1$ may be preset in a case that a goal is to keep performance unchanged and reduce power consumption by half.

For example, the suspension time adjustment unit may determine $tc=250$ mA, $tf=24$ Hz in a case of $p=0.5$, $q=1$, $rc=500$ mA, $rf=24$ Hz.

Then, $Lcps=0$ in a case of $cps\leq 250$ mA, $Lcps=1$ in a case of $250\text{ mA}<cps\leq 375$ mA, $Lcps=2$ in a case of $375\text{ mA}<cps\leq 500$ mA, $Lcps=3$ in a case of $500\text{ mA}<cps\leq 625$ mA, $Lcps=4$ in a case of $cps>625$ mA.

Then, $Lfps=0$ in a case of $fps\geq 24$ Hz, $Lfps=1$ in a case of $fps=23$ Hz, $Lfps=2$ in a case of $fps=22$ Hz, $Lfps=3$ in a case of $fps<21$ Hz.

For example, the suspension time adjustment unit may determine the state parameter $S=S(2, 1)$ in a case of $cps=400$ mA and $fps=23$ Hz.

Finally, the suspension time adjustment unit may input the state parameters of the target abnormal application corresponding to each sampling into the reinforcement learning model to obtain a suspension time adjustment strategy output by the reinforcement learning model, and adjust the suspension time based on the suspension time adjustment strategy.

According to an embodiment of the disclosure, the suspension time adjustment strategy output by the reinforcement learning model may be a preset adjustment strategy. Here, the preset adjustment strategy (hereinafter also referred to as an action A) may include, but not limited to, extending the suspension time t by a unit time (e.g., 1 ms), reducing the suspension time by a unit time (e.g., 1 ms), and remaining unchanged, by referring to the above Table 5:

According to an embodiment of the disclosure, various values of the state parameter may be determined based on the above Tables 3 and 4, so a one-step penalty (hereinafter also known as R) may be set for each state parameter based on a minimization penalty value function. It should be noted that, in a case that the state parameter table represents a serious frame drop, a larger one-step penalty is given, by referring to the above Table 6:

For example, R(S(1, 1))=R(1, 1)=2 in a case of the state parameter S=S(1,1).

According to an embodiment of the disclosure, based on the above state parameter S, action A and one-step penalty R, the suspension time adjustment unit may determine a discounted action value Q of performing A based on S, and the discounted action value Q may be expressed by the above Equation 19, wherein the above Equation 19 may also be expressed as the above Equation 20

According to an embodiment of the disclosure, the suspension time adjustment unit may preset a null Q-value table before restriction on the target abnormal call action, by referring to FIG. 11. During the process of restriction on the target abnormal call action, the suspension time adjustment unit may input the state parameters of the target abnormal application corresponding to each sampling into the reinforcement learning model to obtain the discounted action value Q of performing the action based on the state parameter corresponding to the last sampling, and add the same to the null Q-value table to complete updating of the Q-value table. It should be noted that Q-values in the Q-value table may be covered, in other words, when the discounted action value Q of performing the same action with the same state parameter appears, the previously determined Q-value may be covered by the following determined Q-value.

The process of updating the Q-value table is described with a specific example in conjunction with FIGS. 11 and 12 below.

Specifically, before the restriction on the target abnormal call action, a null Q-value table as shown in FIG. 11 may be acquired, and then the restriction on the target abnormal call action may be performed, the sampling operation is performed continuously during the process of the restriction on the target abnormal call action, and the changes of the state parameter with the action is shown in FIG. 12.

For a change of the state parameter from S(1,1) to S(2,1), R[2,1]=3 may be determined by the above Table 6, and then Q[1,1,1]=0.6 may be determined by the above Equation 20, so an item of Lcps=1, Lfps=1, A=1 in the Q-value table may be updated as 0.6.

For a change of the state parameter from S(2,1) to S(1,1), R[1,1]=2 may be determined by the above Table 6, and then Q[2,1,1]=0.508 may be determined by the above Equation 20, so an item of Lcps=2, Lfps=1, A=1 in the Q-value table may be updated as 0.508.

For a change of the state parameter from S(1,1) to S(0,0), R[0,0]=0 may be determined by the above Table 6, and then Q[1,1,0]=0 may be determined by the above Equation 20, so an item of Lcps=1, Lfps=1, A=0 in the Q-value table may be updated as 0.

Based on the above three changes, three items are updated in the Q-value table, namely, the item of Lcps=1, Lfps=1, A=1 is 0.6, the item of Lcps=2, Lfps=1, A=1 is 0.508, the item of Lcps=1, Lfps=1, A=0 is 0, respectively.

It should be noted that in this embodiment of the disclosure, the learning rates $\alpha$=0.2, $\gamma$=0.9.

According to an embodiment of the disclosure, the suspension time adjustment unit inputs the state parameters of the target abnormal application corresponding to each sampling into the reinforcement learning model, when the Q-values of the same state parameter are not recorded in the Q-value table, any action may be output based on the above Table 5; when the Q-values of the same state parameter are recorded in the Q-value table (that is, the Q-value obtained by performing one of the three actions as in the Table 5 with the same state parameter is at least recorded in the Q-value table), the suspension time adjustment unit may adopt a F-greedy strategy function to determine the output of the reinforcement learning model, specifically:

First, the suspension time adjustment unit may generate a random number x of a section of (0, 1) by using a random function.

Thereafter, the suspension time adjustment unit may determine a size relationship of x and a preset threshold $\varepsilon$ Finally, the suspension time adjustment unit may select an action corresponding action of the smallest one among Q-values of the same status parameter as the suspension time adjustment strategy in a case of $x>\varepsilon$, and the suspension time adjustment unit may select any action the suspension time adjustment strategy based on the above Table 5 in a case of $x\leq\varepsilon$.

Referring to the above embodiment of the disclosure, after performing this suspension time adjustment strategy, the suspension time adjustment unit may update the Q-value table based on the state parameter and the value of R determined by a next sampling.

Based on this, with the continuous restriction on the target abnormal call action, the optimum action may be determined through the above processes, so as to obtain the most appropriate power consumption and performance benefit ratio.

As an example, the state parameter determined by the current sampling is S(2,1). At this time, the Q-values of the same state parameter are recorded in the Q-value table: Q[2,1,0]=0.7, Q[2,1,1]=0.5, Q[2,1,2]=0.9, the preset threshold value F=0.1, then the random number x of the section of (0,1) may be generated by using the random function. The output suspension time adjustment strategy is A=1 in a case of x>0.1, and the output suspension time adjustment strategy is any one of A=0, 1, 2 in a case of x≤0.1.

As an example, the suspension time adjustment unit may regard a case of $x>\varepsilon$ as a preferable case, that is, when the Q-values of the same state parameter are recorded in the Q-value table, the action corresponding to the smallest one of the Q-values of the same state parameter is directly selected as the suspension time adjustment strategy.

Figure 16:
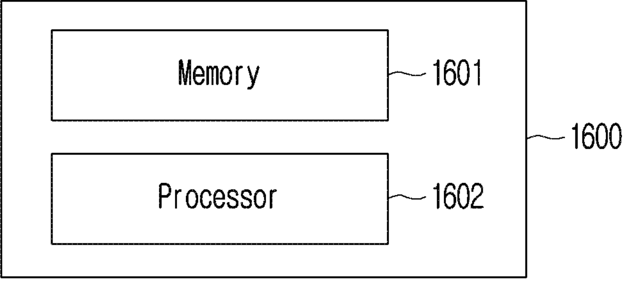
FIG. 16 is a block diagram of an electronic apparatus according to an embodiment of the disclosure.

FIG. 16 is a block diagram of an electronic device according to an embodiment of the disclosure.

Referring to FIG. 16, an electronic device 1600 includes at least one memory 1601 and at least one processor 1602. The at least one memory 1601 stores computer executable instruction sets, the computer executable instruction sets, when being executed by the at least one processor 1602, performs the application running method.

As an example, the electronic device 1600 may be a PC computer, a tablet device, a personal digital assistant, a smartphone, or other devices capable of executing the above set of instructions. Here, the electronic device 1600 does not have to be a single electronic device, but may also be an assembly of any device or circuit that may execute the above instructions (or instruction sets) individually or jointly. The electronic device 1600 may also be part of an integrated control system or system manager, or may be configured as a portable electronic device that is interfaced with a local or remote (e.g., via wireless transmission).

In the electronic device 1600, the processor 1602 may include a central processing unit (CPU), a graphics processor (GPU), a programmable logic device, a dedicated processor system, a microcontroller, or a microprocessor. As an example rather than a limitation, the processor may also include an analog processor, a digital processor, a microprocessor, a multi-core processor, a processor array, a network processor, and the like.

The processor 1602 may run instructions or codes stored in the memory 1601, which may also store data. Instructions and data may also be transmitted and received over the network via a network interface device, which may employ any known transmission protocol.

The memory 1601 may be integrated with the processor 1602. For example, a RAM or flash memory may be arranged in an integrated circuit microprocessor or the like. In addition, the memory 1601 may include an independent device, such as an external disk drive, storage array, or other storage devices that may be used by any database system. The memory 1601 and the processor 1602 may be operationally coupled, or may communicate with each other, for example, through an I/O port, a network connection, or the like, so that the processor 1602 may read files stored in the memory.

In addition, the electronic device 1600 may also include a video display (such as a liquid crystal display) and a user interaction interface (such as a keyboard, mouse, touch input device, or the like). All components of the electronic device 1600 may be connected to each other via a bus and/or network.

According to an embodiment of the disclosure, a computer-readable storage medium for storing instructions may also be provided, wherein the instructions, when being executed by at least one processor, cause the at least one processor to perform the application running method according to the disclosure. Examples of computer-readable storage media here include read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state hard disk (SSD), card memory (such as a multimedia card, secure digital (SD) card, or extreme digital (XD) card), magnetic tape, floppy disk, magneto-optical data storage device, optical data storage device, hard disk, solid state disk, and any other devices configured to store the computer applications and any associated data, data files and data structures in a non-transitory manner, and provide the computer applications and any associated data, data files and data structures to a processor or computer so that the processor or computer can execute the computer applications. The computer applications in the above-mentioned computer readable storage medium can be executed in an environment deployed in a computer device, such as a client, a host, a proxy device, a server, or the like, in addition, in one example, the computer applications and any associated data, data files and data structures are distributed over networked computer systems so that the computer applications and any associated data, data files and data structures are stored, accessed and executed in a distributed manner by one or more processors or computers.

According to the application running method, apparatus, electronic device and storage medium of the disclosure, in which by determining a target application which is abnormal based on current running data of an electronic terminal, determining a target call action among call actions of the target application, performing restriction on the target call action in a case that it is predicted that the target call actions is abnormal, it is able to capture applications of which system services are called abnormally with a high frequency, and locate the abnormal call action accurately, so as to address the issues of high load and high current consumption, while improving the situation of heating and lagging, and improve user experience.

According to an aspect of an embodiment of the disclosure, there is provided an application running method, including: acquiring feature data of all running applications, wherein the feature data includes current system state data and running state data of an application; determining a target abnormal application based on the feature data of all the running applications; acquiring interactive data of all call actions of the target abnormal application within a preset duration; determining a target abnormal call action based on the interactive data of all the call actions; performing call restriction on the target abnormal call action in response to monitoring the target abnormal call action.

Alternatively, the determining the target abnormal application based on the feature data of all the running applications may include: determining target applications from among all the running applications based on the running state data of all the running applications; determining the target abnormal application from among the target applications based on feature data of the target applications.

Alternatively, the running state data of the application may include a CPU occupancy rate when the application is running; the determining the target applications from among all the running applications based on the running state data of all the running applications may include selecting the top N applications of highest CPU occupancy rate from among all the running applications, wherein the N is a preset positive integer; determining the top N applications of highest CPU occupancy rate as the target applications.

Alternatively, the determining the target abnormal application from among the target applications based on the feature data of the target applications may include: obtaining a corresponding decision result of each target application through a decision tree model based on the feature data of each target application, determining the target abnormal application from among the target applications based on the decision results.

Alternatively, after the determining the target abnormal application based on the feature data of all the running applications, may further include displaying a first notification information, wherein the first notification information indicates the existence of the target abnormal application and prompts a user an optimization function for the target abnormal application is able to be opened; executing a first operation in response to receiving an opening instruction for the optimization function, wherein the first operation includes acquiring the interactive data of all the call actions of the target abnormal application within the preset duration, determining the target abnormal call action based on the interactive data of all the call actions; performing the call restriction on the target abnormal call action in response to monitoring the target abnormal call action.

Alternatively, the application running method may further include: displaying second notification information during the process of the first operation, wherein the second notification information prompts the use the optimization function for the target abnormal application is able to be closed; stopping executing the first operation in response to receiving a closing instruction for the optimization function.

Alternatively, after the determining the target abnormal call action based on the interactive data of all the call actions, the application running method may further include: acquiring a label indicating whether the decision result is correct; updating the decision tree model based on the label and the feature data of the target abnormal application.

Alternatively, a call action may include a first type of call action and a second type of call action, wherein the first type of call action is calling any one function in a system service by any one thread in the target abnormal application, the second type of call action is calling any one function in other applications by any one thread in the target abnormal application; the interactive data may include a number of calls of a call action within the preset duration; the determining the target abnormal call action based on the interactive data of all the call actions may include screening the first type of call actions from among all the call actions, determining the first type of call action with the most number of calls as a target call action, determining the target abnormal call action based on the number of calls of the target call action within the preset duration.

Alternatively, the determining the target abnormal call action based on the number of calls of the target call action within the preset duration may include obtaining an abnormal probability of the target call action through a Gaussian mixture clustering model based on the number of calls of the target call action within the preset duration, determining the target call action as the target abnormal call action in response to the abnormal probability being higher than a preset threshold.

Alternatively, the performing the call restriction on the target abnormal call action in response to monitoring the target abnormal call action may include suspending the execution of the target abnormal call action in response to monitoring the target abnormal call action, releasing the suspension of the target abnormal call action after preset suspension time has elapsed.

Alternatively, the application running method may further include: during the process of performing the call restriction on the target abnormal call action, adjusting the preset suspension time several times through a reinforcement learning model based on power consumption data and performance data of the target abnormal application, to achieve an optimal suspension time.

According to an aspect of an embodiment of the disclosure, there is provided an application running device, including a running data acquisition unit configured to acquire feature data of all running applications, wherein the feature data includes current system state data and running state data of an application, a target application determination unit configured to determine a target abnormal application based on the feature data of all the running applications, an interactive data acquisition unit configured to acquire the interactive data of all call actions of the target abnormal application within a preset duration, an action abnormal determination unit configured to determine a target abnormal call action based on the interactive data of all the call actions, an abnormal action restriction unit configured to perform call restriction on the target abnormal call action in response to monitoring the target abnormal call action.

Alternatively, the target application determination unit may be configured to: determine target applications from among all the running applications based on the running state data of all the running applications; determine the target abnormal application from among the target applications based on feature data of the target applications.

Alternatively, the running state data of the application may include a CPU occupancy rate when the application is running, the target application determination unit may be configured to select the top N applications of highest CPU occupancy rate from among all the running applications, wherein the N is a preset positive integer, determine the top N applications of highest CPU occupancy rate as the target applications.

Alternatively, the target application determination unit may be configured to obtain a corresponding decision result of each target application through a decision tree model based on the feature data of each target application, determine the target abnormal application from among the target applications based on the decision results.

Alternatively, the application running device may further include a display unit and a receiving unit, wherein, after the target application determination unit determines the target abnormal application based on the feature data of all the running applications, the display unit displays a first notification information, wherein the first notification information indicates the existence of the target abnormal application and prompts a user an optimization function for the target abnormal application is able to be opened, in response to the receiving unit receiving an opening instruction for the optimization function, the interactive data acquisition unit, the action abnormal determination unit and the abnormal action restriction unit execute operations.

Alternatively, during the processes of the interactive data acquisition unit, the action abnormal determination unit and the abnormal action restriction unit, the display unit may display second notification information, wherein the second notification information prompts the user the optimization function for the target abnormal application is able to be closed, the interactive data acquisition unit, the action abnormal determination unit and the abnormal action restriction unit may stop executing the operations in response to the receiving unit receiving a closing instruction for the optimization function.

Alternatively, the application running device may further include an updating sample acquisition unit and a decision tree model updating unit, wherein, the updating sample acquisition unit may be configured to acquire a label indicating whether the decision result is correct, wherein, the decision tree model updating unit may be configured to update the decision tree model based on the label and the feature data of the target abnormal application.

Alternatively, a call action may include a first type of call action and a second type of call action, wherein the first type of call action is calling any one function in a system service by any one thread in the target abnormal application, the second type of call action is calling any one function in other applications by any one thread in the target abnormal application, the interactive data may include a number of calls of a call action within the preset duration, the action abnormal determination unit may be configured to screen the first type of call actions from among all the call actions, determine the first type of call action with the most number of calls as a target call action, determine the target abnormal call action based on the number of calls of the target call action within the preset duration.

Alternatively, the action abnormal determination unit may be configured to: obtain an abnormal probability of the target call action through a Gaussian mixture clustering model based on the number of calls of the target call action within the preset duration, determine the target call action as the target abnormal call action in response to the abnormal probability being higher than a preset threshold.

Alternatively, the abnormal action restriction unit may be configured to suspend the execution of the target abnormal call action in response to monitoring the target abnormal call action, release the suspension of the target abnormal call action after preset suspension time has elapsed.

Alternatively, the application running device may further include a suspension time adjustment unit configured to during the process of performing the call restriction on the target abnormal call action, adjusting the preset suspension time several times through a reinforcement learning model based on power consumption data and performance data of the target abnormal application, to achieve an optimal suspension time.

According to an aspect of an embodiment of the disclosure, there is provided an electronic apparatus, including at least one processor, at least one memory storing computer executable instructions, wherein, the computer executable instructions, when being executed by the at least one processor, cause the at least one processor to perform the application running method according to the disclosure.

According to an aspect of an embodiment of the disclosure, there is provided a computer-readable storage medium storing instructions, wherein, the instructions, when being executed by at least one processor, cause the at least one processor to perform the application running method according to the disclosure.

The technical solution provided by the embodiment of the disclosure brings at least the following beneficial effects:

According to the application running method, apparatus, electronic device and storage medium of the disclosure, by determining a target application which is abnormal based on current running data of an electronic terminal, determining a target call action among call actions of the target application, performing restriction on the target call action in a case that it is predicted that the target call action is abnormal, it is able to capture applications of which system services are called with an abnormal high frequency, and locate the abnormal call action accurately, so as to address the issues of high load and high current consumption, while improving the situation of heating and lagging, and improve user experience.

It should be understood that the above general description and the following detailed description are only illustrative and explanatory, and do not limit the disclosure.

According to an aspect of an embodiment of the disclosure, there is provided an application running method, including acquiring feature data of all running applications, wherein the feature data includes current system state data and running state data of an application; determining a target abnormal application based on the feature data of all the running applications, acquiring interactive data of all call actions of the target abnormal application within a preset duration, determining a target abnormal call action based on the interactive data of all the call actions, performing call restriction on the target abnormal call action in response to monitoring the target abnormal call action.

Alternatively, the determining the target abnormal application based on the feature data of all the running applications may include determining target applications from among all the running applications based on the running state data of all the running applications, determining the target abnormal application from among the target applications based on feature data of the target applications.

Alternatively, the running state data of the application may include a CPU occupancy rate when the application is running, the determining the target applications from among all the running applications based on the running state data of all the running applications may include selecting the top N applications of highest CPU occupancy rate from among all the running applications, wherein the N is a preset positive integer, determining the top N applications of highest CPU occupancy rate as the target applications.

Alternatively, the determining the target abnormal application from among the target applications based on the feature data of the target applications may include obtaining a corresponding decision result of each target application through a decision tree model based on the feature data of each target application, determining the target abnormal application from among the target applications based on the decision results.

Alternatively, after the determining the target abnormal application based on the feature data of all the running applications, may further include displaying a first notification information, wherein the first notification information indicates the existence of the target abnormal application and prompts a user an optimization function for the target abnormal application is able to be opened, executing a first operation in response to receiving an opening instruction for the optimization function, wherein the first operation includes acquiring the interactive data of all the call actions of the target abnormal application within the preset duration, determining the target abnormal call action based on the interactive data of all the call actions, performing the call restriction on the target abnormal call action in response to monitoring the target abnormal call action.

Alternatively, the application running method may further include displaying second notification information during the process of the first operation, wherein the second notification information prompts the use the optimization function for the target abnormal application is able to be closed, stopping executing the first operation in response to receiving a closing instruction for the optimization function.

Alternatively, after the determining the target abnormal call action based on the interactive data of all the call actions, the application running method may further include acquiring a label indicating whether the decision result is correct, updating the decision tree model based on the label and the feature data of the target abnormal application.

Alternatively, a call action may include a first type of call action and a second type of call action, wherein the first type of call action is calling any one function in a system service by any one thread in the target abnormal application, the second type of call action is calling any one function in other applications by any one thread in the target abnormal application, the interactive data may include a number of calls of a call action within the preset duration, the determining the target abnormal call action based on the interactive data of all the call actions may include screening the first type of call actions from among all the call actions, determining the first type of call action with the most number of calls as a target call action, determining the target abnormal call action based on the number of calls of the target call action within the preset duration.

Alternatively, the determining the target abnormal call action based on the number of calls of the target call action within the preset duration may include obtaining an abnormal probability of the target call action through a Gaussian mixture clustering model based on the number of calls of the target call action within the preset duration, determining the target call action as the target abnormal call action in response to the abnormal probability being higher than a preset threshold.

Alternatively, the performing the call restriction on the target abnormal call action in response to monitoring the target abnormal call action may include suspending the execution of the target abnormal call action in response to monitoring the target abnormal call action, releasing the suspension of the target abnormal call action after preset suspension time has elapsed.

Alternatively, the application running method may further include during the process of performing the call restriction on the target abnormal call action, adjusting the preset suspension time several times through a reinforcement learning model based on power consumption data and performance data of the target abnormal application, to achieve an optimal suspension time.

According to an aspect of the embodiment of the disclosure, there is provided an application running device, including a running data acquisition unit configured to acquire feature data of all running applications, wherein the feature data includes current system state data and running state data of an application, a target application determination unit configured to determine a target abnormal application based on the feature data of all the running applications, an interactive data acquisition unit configured to acquire the interactive data of all call actions of the target abnormal application within a preset duration, an action abnormal determination unit configured to determine a target abnormal call action based on the interactive data of all the call actions, an abnormal action restriction unit configured to perform call restriction on the target abnormal call action in response to monitoring the target abnormal call action.

The "determine" may described as "identify" or "obtain".

Alternatively, the target application determination unit may be configured to determine target applications from among all the running applications based on the running state data of all the running applications, determine the target abnormal application from among the target applications based on feature data of the target applications.

Alternatively, the running state data of the application may include a CPU occupancy rate when the application is running, the target application determination unit may be configured to select the top N applications of highest CPU occupancy rate from among all the running applications, wherein the N is a preset positive integer, determine the top N applications of highest CPU occupancy rate as the target applications.

Alternatively, the target application determination unit may be configured to obtain a corresponding decision result of each target application through a decision tree model based on the feature data of each target application, determine the target abnormal application from among the target applications based on the decision results.

Alternatively, the application running device may further include a display unit and a receiving unit, wherein, after the target application determination unit determines the target abnormal application based on the feature data of all the running applications, the display unit displays a first notification information, wherein the first notification information indicates the existence of the target abnormal application and prompts a user an optimization function for the target abnormal application is able to be opened, in response to the receiving unit receiving an opening instruction for the optimization function, the interactive data acquisition unit, the action abnormal determination unit and the abnormal action restriction unit execute operations.

Alternatively, during the processes of the interactive data acquisition unit, the action abnormal determination unit and the abnormal action restriction unit, the display unit may display second notification information, wherein the second notification information prompts the user the optimization function for the target abnormal application is able to be closed, the interactive data acquisition unit, the action abnormal determination unit and the abnormal action restriction unit may stop executing the operations in response to the receiving unit receiving a closing instruction for the optimization function.

Alternatively, the application running device may further include an updating sample acquisition unit and a decision tree model updating unit, wherein, the updating sample acquisition unit may be configured to acquire a label indicating whether the decision result is correct; wherein, the decision tree model updating unit may be configured to update the decision tree model based on the label and the feature data of the target abnormal application.

Alternatively, a call action may include a first type of call action and a second type of call action, wherein the first type of call action is calling any one function in a system service by any one thread in the target abnormal application, the second type of call action is calling any one function in other applications by any one thread in the target abnormal application, the interactive data may include a number of calls of a call action within the preset duration, the action abnormal determination unit may be configured to: screen the first type of call actions from among all the call actions, determine the first type of call action with the most number of calls as a target call action, determine the target abnormal call action based on the number of calls of the target call action within the preset duration.

Alternatively, the action abnormal determination unit may be configured to obtain an abnormal probability of the target call action through a Gaussian mixture clustering model based on the number of calls of the target call action within the preset duration, determine the target call action as the target abnormal call action in response to the abnormal probability being higher than a preset threshold.

Alternatively, the abnormal action restriction unit may be configured to suspend the execution of the target abnormal call action in response to monitoring the target abnormal call action, release the suspension of the target abnormal call action after preset suspension time has elapsed.

Alternatively, the application running device may further include a suspension time adjustment unit configured to during the process of performing the call restriction on the target abnormal call action, adjusting the preset suspension time several times through a reinforcement learning model based on power consumption data and performance data of the target abnormal application, to achieve an optimal suspension time.

According to an aspect of an embodiment of the disclosure, there is provided an electronic apparatus, including: at least one processor; at least one memory storing computer executable instructions, wherein, the computer executable instructions, when being executed by the at least one processor, cause the at least one processor to perform the application running method according to the disclosure.

According to an aspect of an embodiment of the disclosure, there is provided a computer-readable storage medium storing instructions, wherein, the instructions, when being executed by at least one processor, cause the at least one processor to perform the application running method according to the disclosure.

The technical solution provided by the embodiment of the disclosure brings at least the following beneficial effects:

According to the application running method, apparatus, electronic device and storage medium of the disclosure, by determining a target application which is abnormal based on current running data of an electronic terminal, determining a target call action among call actions of the target application, performing restriction on the target call action in a case that it is predicted that the target call action is abnormal, it is able to capture applications of which system services are called with an abnormal high frequency, and locate the abnormal call action accurately, so as to address the issues of high load and high current consumption, while improving the situation of heating and lagging, and improve user experience.

It should be understood that the above general description and the following detailed description are only illustrative and explanatory, and do not limit the disclosure.

After considering the description and practicing the disclosure, those skilled in the art are easily think of other embodiments of the disclosure. The present application intends to cover any variation, use or adaptation of the disclosure, which follow general principles of the disclosure and include the common general knowledge or frequently used technical means in the technical field, which are not disclosed in the disclosure. The description and the embodiments are only regarded as exemplary, and the true scope and spirit of the disclosure are indicated by the following claims.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling an electronic apparatus for running at least one application, the method comprising:

obtaining, by the electronic apparatus, feature data corresponding to a plurality of running applications running in the electronic apparatus, wherein the feature data comprises current system state data and running state data corresponding to the at least one application;

identifying, by the electronic apparatus, a target abnormal application based on the feature data corresponding to the plurality of running applications;

obtaining, by the electronic apparatus, interactive data corresponding to a plurality of call actions of the target abnormal application within a preset duration, the interactive data including a number of calls of each of the plurality of call actions within the preset duration;

identifying, by the electronic apparatus, a target abnormal call action based on the number of calls of each of the plurality of call actions within the preset duration; and performing, by the electronic apparatus, call restriction on the target abnormal call action based on monitoring the target abnormal call action.

2. The method of claim 1, wherein, the identifying of the target abnormal application based on the feature data corresponding to the plurality of running applications comprises:

identifying target applications from among the plurality of running applications based on the running state data corresponding to the plurality of running applications; and identifying the target abnormal application from among the target applications based on feature data corresponding to the target applications.

3. The method of claim 2, wherein, the running state data corresponding to the at least one application comprises a central processing unit (CPU) occupancy rate when the at least one application is running; and wherein the identifying of the target applications from among the plurality of running applications based on the running state data corresponding to the plurality of running applications comprises:

selecting top N applications of highest CPU occupancy rate from among the plurality of running applications, wherein the N is a preset positive integer; and identifying the top N applications of highest CPU occupancy rate as the target applications.

4. The method of claim 2, wherein, the identifying of the target abnormal application from among the target applications based on the feature data corresponding to the target applications comprises:

obtaining a corresponding decision result of each target application through a decision tree model based on the feature data corresponding to each target application; and identifying the target abnormal application from among the target applications based on the decision results.

5. The method of claim 4, wherein, after the identifying of the target abnormal call action based on the interactive data corresponding to the plurality of call actions, further comprises:

obtaining a label indicating whether the decision result is correct; and updating the decision tree model based on the label and the feature data corresponding to the target abnormal application.

6. The method of claim 1, wherein, after the identifying of the target abnormal application based on the feature data corresponding to the plurality of running applications, the method further comprises:

displaying a first notification information, wherein the first notification information indicates existence of the target abnormal application and prompts a user an optimization function for the target abnormal application is able to be opened; and executing a first operation based on receiving an opening instruction for the optimization function, and wherein the first operation comprises:

obtaining the interactive data corresponding to the plurality of call actions of the target abnormal application within the preset duration;

identifying the target abnormal call action based on the interactive data corresponding to the plurality of call actions; and performing the call restriction on the target abnormal call action based on monitoring the target abnormal call action.

7. The method of claim 6, further comprising:

displaying second notification information during a process of the first operation, wherein the second notification information prompts the user the optimization function for the target abnormal application is able to be closed; and stopping executing the first operation based on receiving a closing instruction for the optimization function.

8. The method of claim 1, wherein, each call action is one of a first type of call action or a second type of call action, wherein the first type of call action is calling to any one function in a system service by any one thread in the target abnormal application, the second type of call action is calling to any one function in another application by any one thread in the target abnormal application, and wherein the identifying the target abnormal call action based on the interactive data corresponding to the plurality of call actions comprises:

screening the first type of call actions from among the plurality of call actions, identifying the first type of call action with the greatest number of calls as a target call action, and identifying the target abnormal call action based on the number of calls of the target call action within the preset duration.

9. The method of claim 8, wherein, the identifying of the target abnormal call action based on the number of calls of the target call action within the preset duration comprises:

obtaining an abnormal probability of the target call action through a Gaussian mixture clustering model based on the number of calls of the target call action within the preset duration; and identifying the target call action as the target abnormal call action based on the abnormal probability being higher than a preset threshold.

10. The method of claim 1, wherein, the performing of the call restriction on the target abnormal call action based on monitoring the target abnormal call action comprises:

suspending execution of the target abnormal call action based on monitoring the target abnormal call action; and releasing the suspension of the target abnormal call action after preset suspension time has elapsed.

11. The method of claim 10, further comprising:

during a process of performing the call restriction on the target abnormal call action, adjusting a preset suspension time several times through a reinforcement learning model based on power consumption data and performance data corresponding to the target abnormal application, to achieve an optimal suspension time.

12. An electronic apparatus for running at least one application, the electronic apparatus comprising:

memory storing one or more computer programs; and one or more processors communicatively coupled to the memory, wherein the one or more computer programs include computer-executable instructions that, when executed by the one or more processors individually or collectively, cause the electronic apparatus to:

obtain feature data corresponding to a plurality of running applications running in the electronic apparatus, wherein the feature data comprises current system state data and running state data corresponding to the at least one application, identify a target abnormal application based on the feature data corresponding to the plurality of running applications, obtain interactive data corresponding to a plurality of call actions of the target abnormal application within a preset duration, the interactive data including a number of calls of each of the plurality of call actions within the preset duration, identify a target abnormal call action based on the number of calls of each of the plurality of call actions within the preset duration, and perform call restriction on the target abnormal call action based on monitoring the target abnormal call action.

13. The electronic apparatus of claim 12, wherein the one or more computer programs further include computer-executable instructions that, when executed by the one or more processors individually or collectively, cause the electronic apparatus to:

identify target applications from among the plurality of running applications based on the running state data corresponding to the plurality of running applications, and identify the target abnormal application from among the target applications based on feature data corresponding to the target applications.

14. The electronic apparatus of claim 13, wherein the running state data corresponding to the application comprises a central processing unit (CPU) occupancy rate when the at least one application is running, and wherein the one or more computer programs further include computer-executable instructions that, when executed by the one or more processors individually or collectively, cause the electronic apparatus to:

select top N applications of highest CPU occupancy rate from among the plurality of running applications, wherein the N is a preset positive integer, and identify the top N applications of highest CPU occupancy rate as the target applications.

15. The electronic apparatus of claim 13, wherein the one or more computer programs further include computer-executable instructions that, when executed by the one or more processors individually or collectively, cause the electronic apparatus to:

obtain a corresponding decision result of each target application through a decision tree model based on the feature data corresponding to each target application, and identify the target abnormal application from among the target applications based on the decision results.

16. The electronic apparatus of claim 15, wherein the one or more computer programs further include computer-executable instructions that, when executed by the one or more processors individually or collectively, cause the electronic apparatus to:

obtain a label indicating whether the decision result is correct, and update the decision tree model based on the label and the feature data corresponding to the target abnormal application.

17. The electronic apparatus of claim 12, wherein the one or more computer programs further include computer-executable instructions that, when executed by the one or more processors individually or collectively, cause the electronic apparatus to:

display a first notification information, wherein the first notification information indicates existence of the target abnormal application and prompts a user an optimization function for the target abnormal application is able to be opened, and execute a first operation based on receiving an opening instruction for the optimization function, and wherein the first operation comprises:

obtaining the interactive data corresponding to the plurality of call actions of the target abnormal application within the preset duration, identifying the target abnormal call action based on the interactive data corresponding to the plurality of call actions, and performing the call restriction on the target abnormal call action based on monitoring the target abnormal call action.

18. The electronic apparatus of claim 17, wherein the one or more computer programs further include computer-executable instructions that, when executed by the one or more processors individually or collectively, cause the electronic apparatus to:

display second notification information during a process of the first operation, wherein the second notification information prompts the user the optimization function for the target abnormal application is able to be closed, and stop executing the first operation based on receiving a closing instruction for the optimization function.

19. One or more non-transitory computer-readable storage media storing computer-executable instructions that, when executed by one or more processors individually or collectively, cause an electronic apparatus to perform operations, the operations comprising:

obtaining feature data corresponding to a plurality of running applications running in the electronic apparatus, wherein the feature data comprises current system state data and running state data corresponding to at least one application;

identifying a target abnormal application based on the feature data corresponding to the plurality of running applications;

obtaining interactive data corresponding to a plurality of call actions of the target abnormal application within a preset duration, the interactive data including a number of calls of each of the plurality of call actions within the preset duration;

identifying a target abnormal call action based on the number of calls of each of the plurality of call actions within the preset duration; and performing call restriction on the target abnormal call action based on monitoring the target abnormal call action.

20. The one or more non-transitory computer-readable storage media of claim 19, wherein, the identifying of the target abnormal application based on the feature data corresponding to the plurality of running applications comprises:

identifying target applications from among the plurality of running applications based on the running state data corresponding to the plurality of running applications; and identifying the target abnormal application from among the target applications based on feature data corresponding to the target applications.

* * * * *